(12) United States Patent
Berger

(10) Patent No.: US 8,550,304 B2
(45) Date of Patent: Oct. 8, 2013

(54) FLUID DISPENSER ATTACHED TO HANDLE

(76) Inventor: Harvey Elliott Berger, Longwood, FL (US)

(*) Notice: Subject to any disclaimer, the term of this patent is extended or adjusted under 35 U.S.C. 154(b) by 34 days.

(21) Appl. No.: 13/411,427

(22) Filed: Mar. 2, 2012

(65) Prior Publication Data

US 2012/0223101 A1 Sep. 6, 2012

Related U.S. Application Data

(63) Continuation-in-part of application No. 12/212,551, filed on Sep. 17, 2008, now Pat. No. 8,167,174.

(51) Int. Cl.
 *B67D 7/78* (2010.01)

(52) U.S. Cl.
 USPC .................................. 222/145.5; 222/465.1

(58) Field of Classification Search
 USPC ............ 222/145.5, 145.6, 145.8, 144.5, 134, 222/94, 527, 175, 465.1, 469–474; 206/219; 224/148.2
 See application file for complete search history.

(56) References Cited

U.S. PATENT DOCUMENTS

| | | | | |
|---|---|---|---|---|
| 2,849,256 A * | 8/1958 | Kowal | ........................... | 422/282 |
| 3,669,101 A * | 6/1972 | Kleiner | ........................ | 601/164 |
| 4,279,362 A * | 7/1981 | Pursell | ........................... | 222/94 |
| 4,871,352 A * | 10/1989 | Tran | ................................ | 604/82 |
| 6,485,451 B1 * | 11/2002 | Roberts et al. | ................... | 604/35 |
| 6,968,983 B2 * | 11/2005 | Laible | ........................ | 222/464.1 |

* cited by examiner

*Primary Examiner* — Lien Ngo
(74) *Attorney, Agent, or Firm* — Paul Royal, Jr.; The Patent Guild

(57) ABSTRACT

A Fluid Dispenser including a inline fluid dispenser removably attached to a handle which is well suited for usage such as spraying insecticide or anti-fungal solutions, spraying fire retardant solutions, spraying decontaminants, and other situations where mixing of the Inline Fluid Dispenser contents with a fluid source is necessary.

20 Claims, 29 Drawing Sheets

1

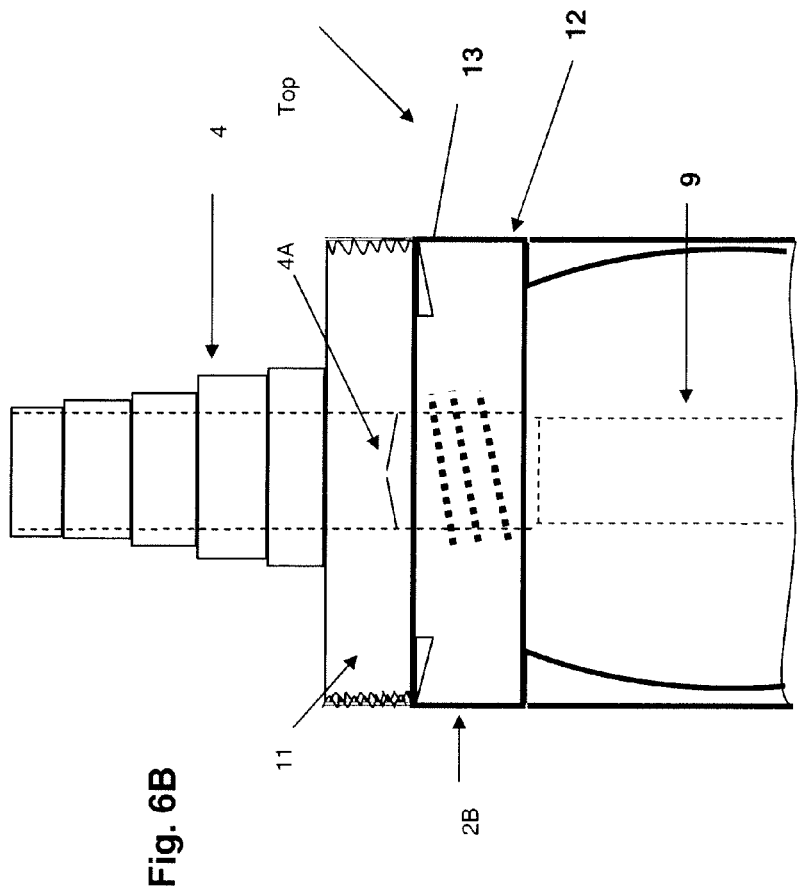
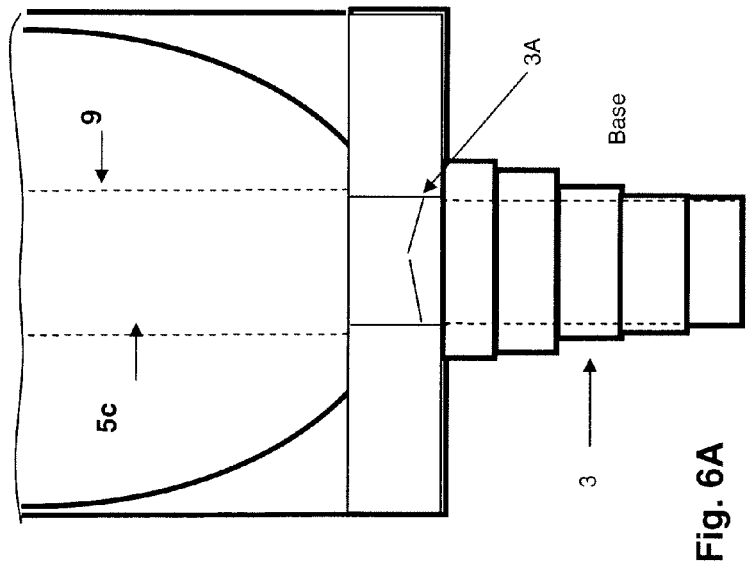
Fig. 6B
Fig. 6A

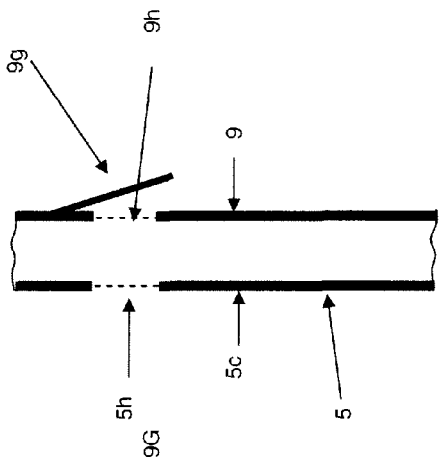
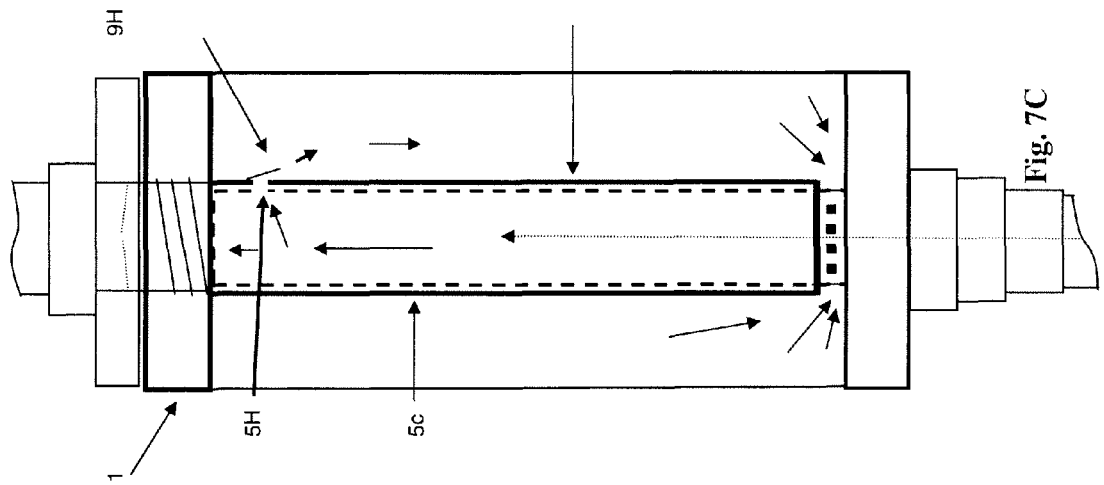
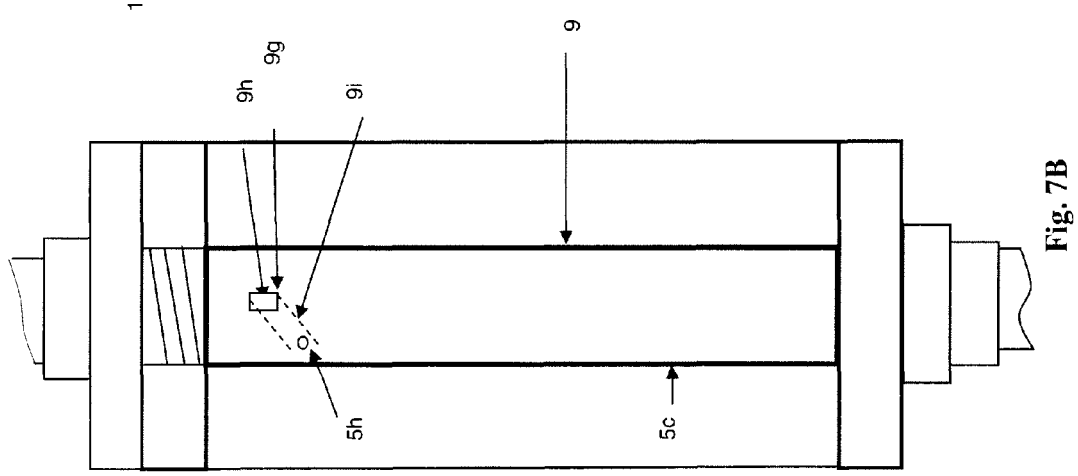

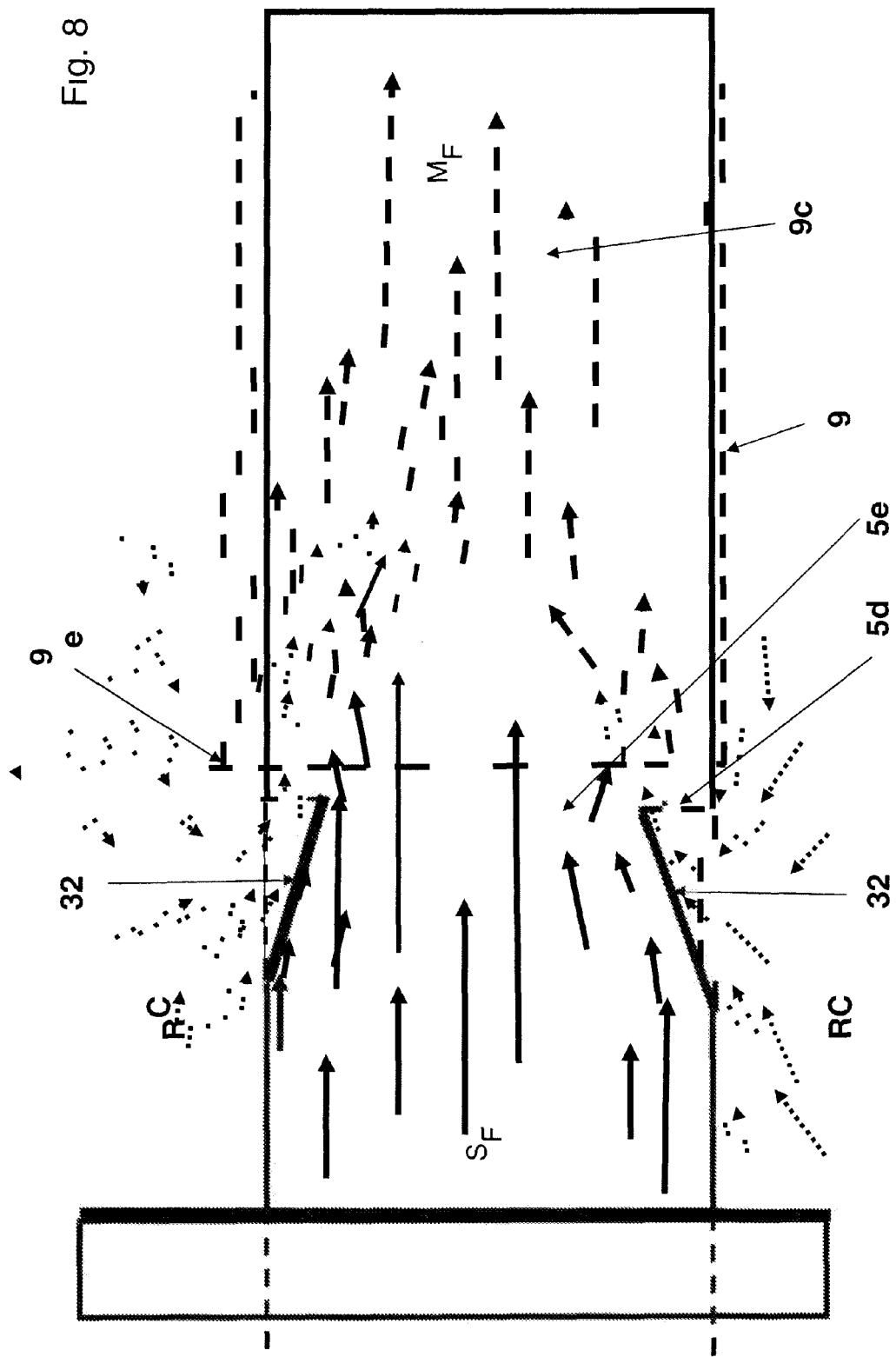

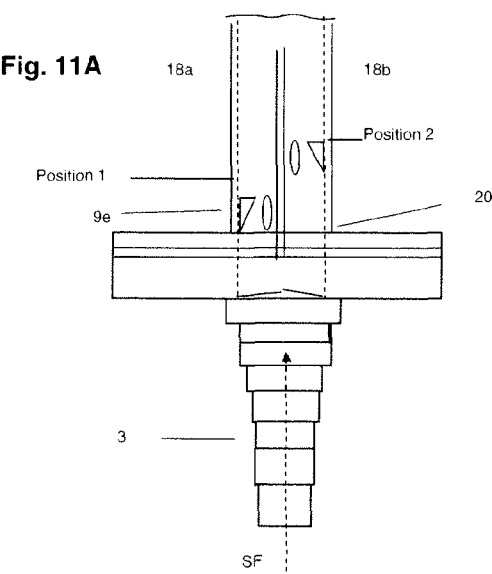
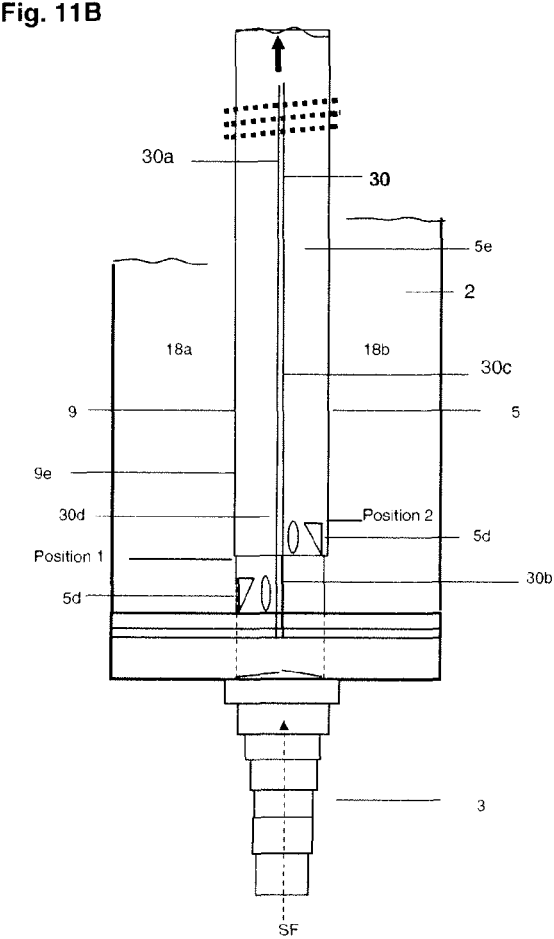
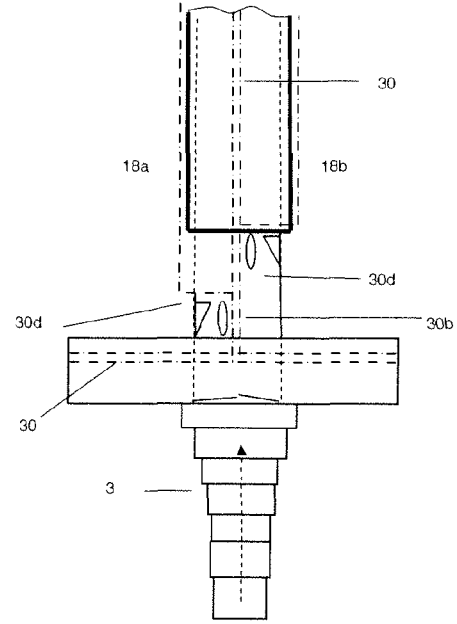

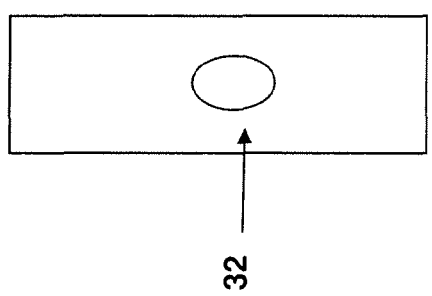
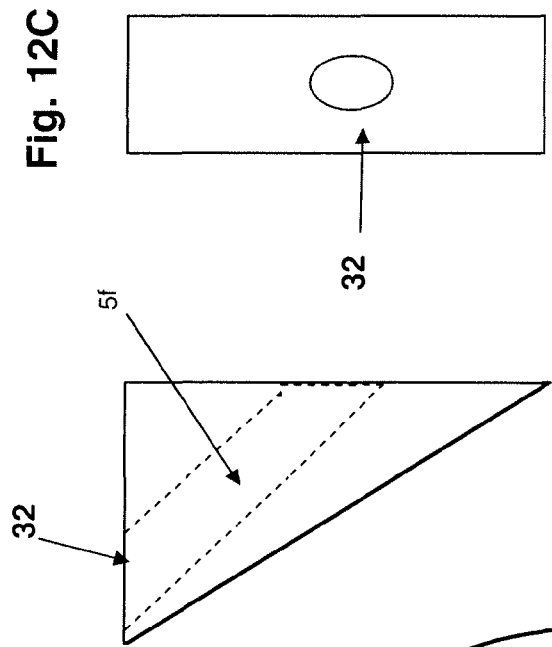
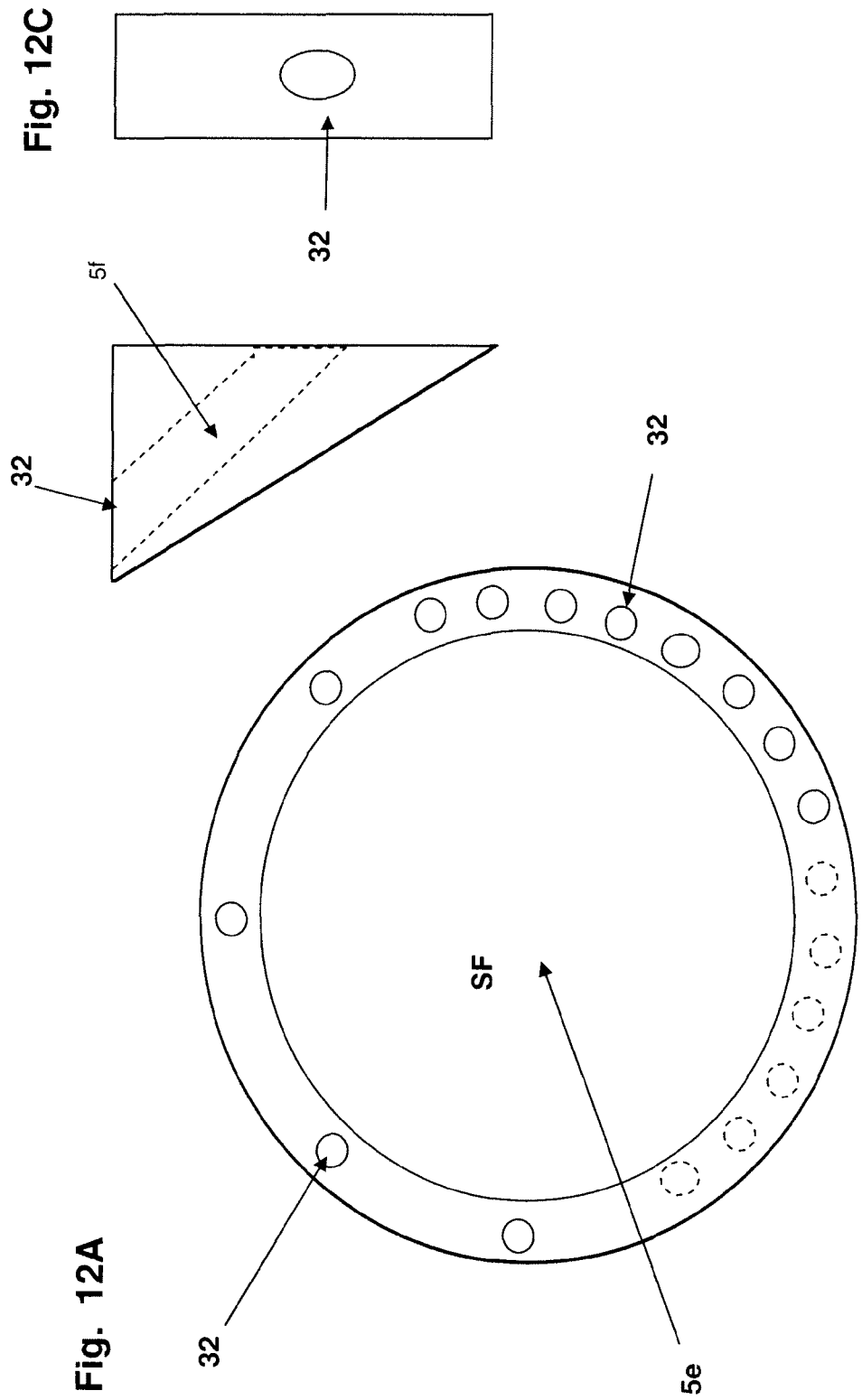

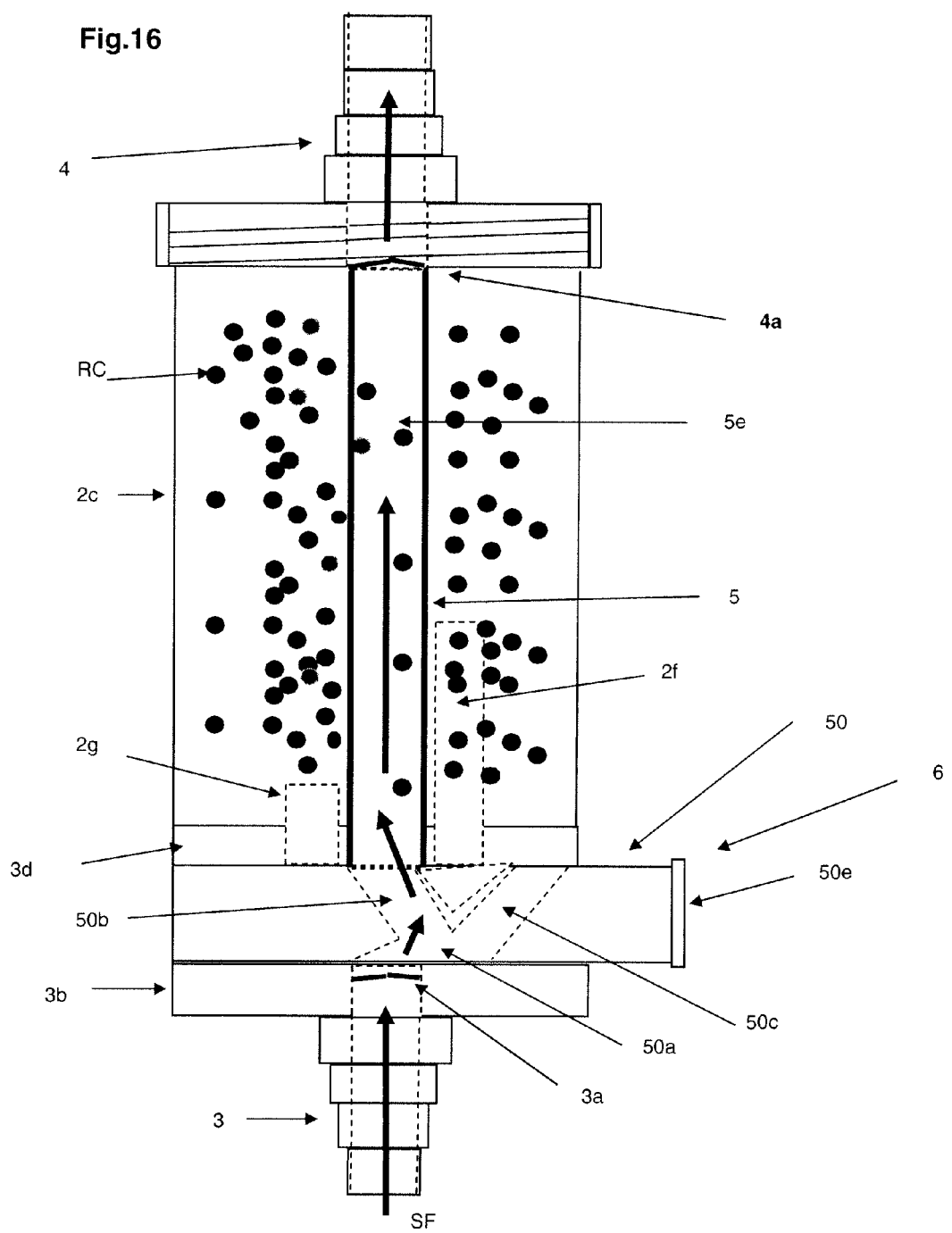

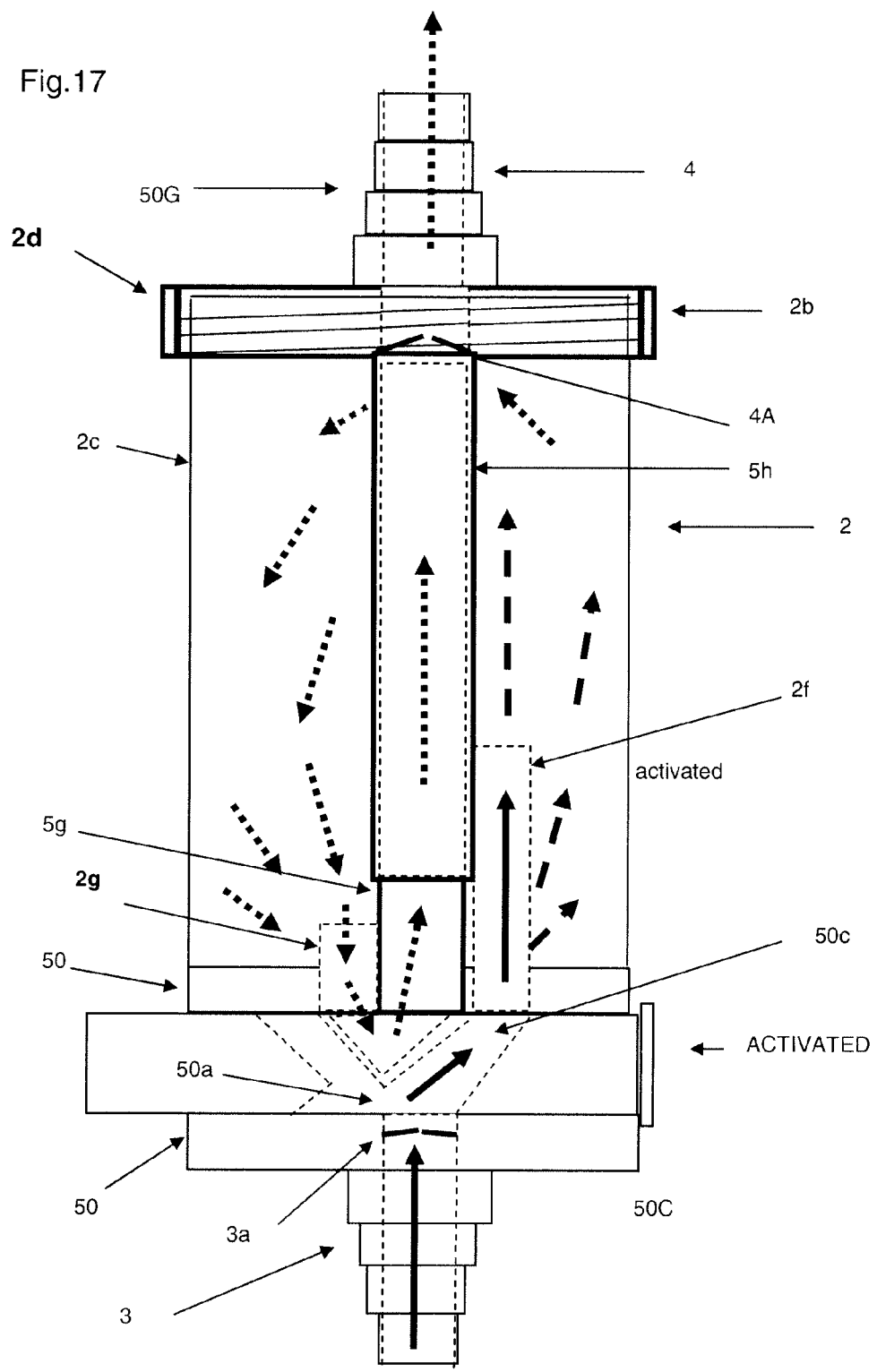

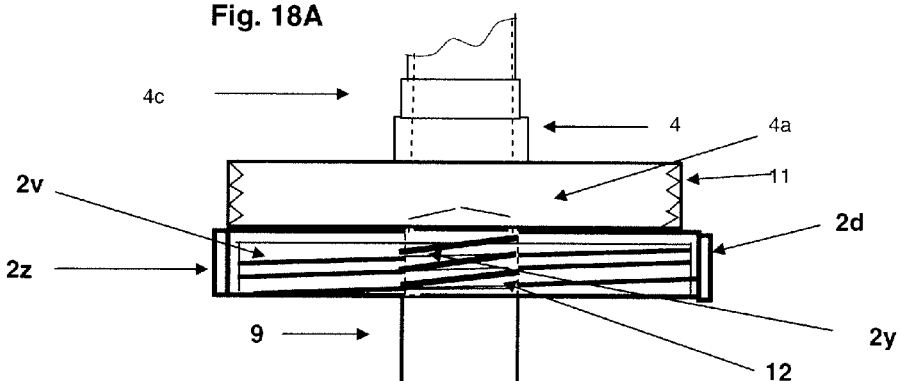
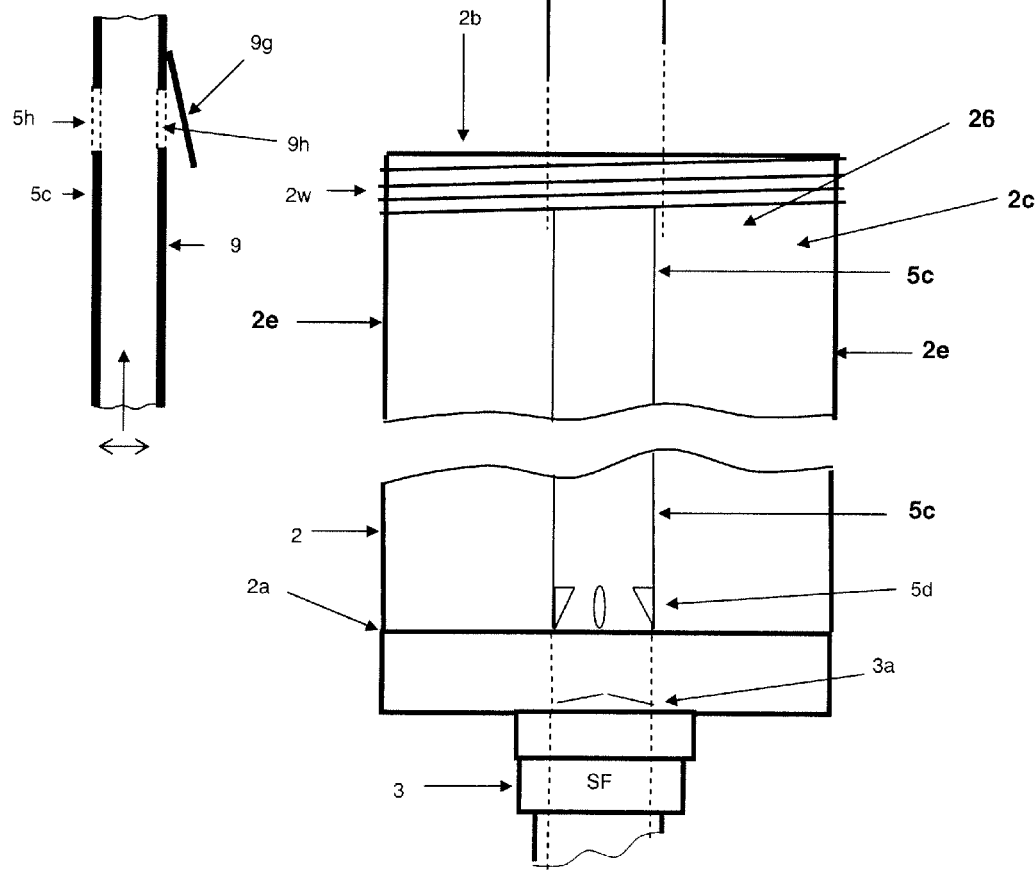
Fig. 18A
Fig. 18B

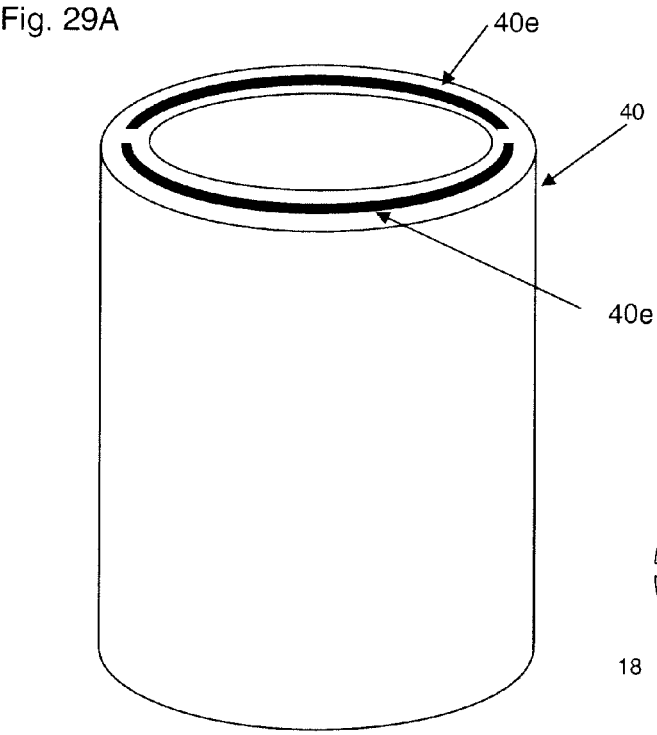
Fig. 29A
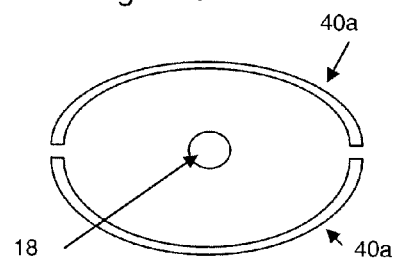
Fig. 29C
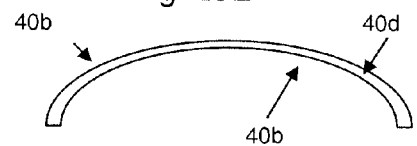
Fig. 29E
Fig. 29D
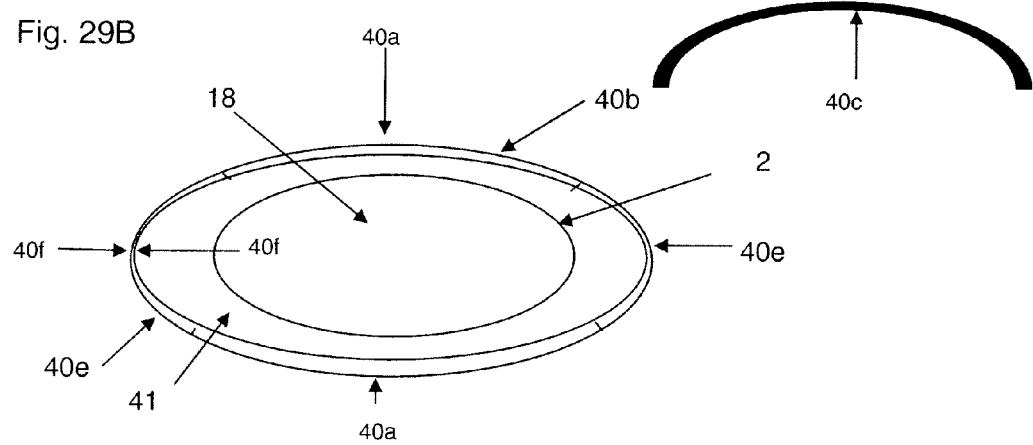
Fig. 29B

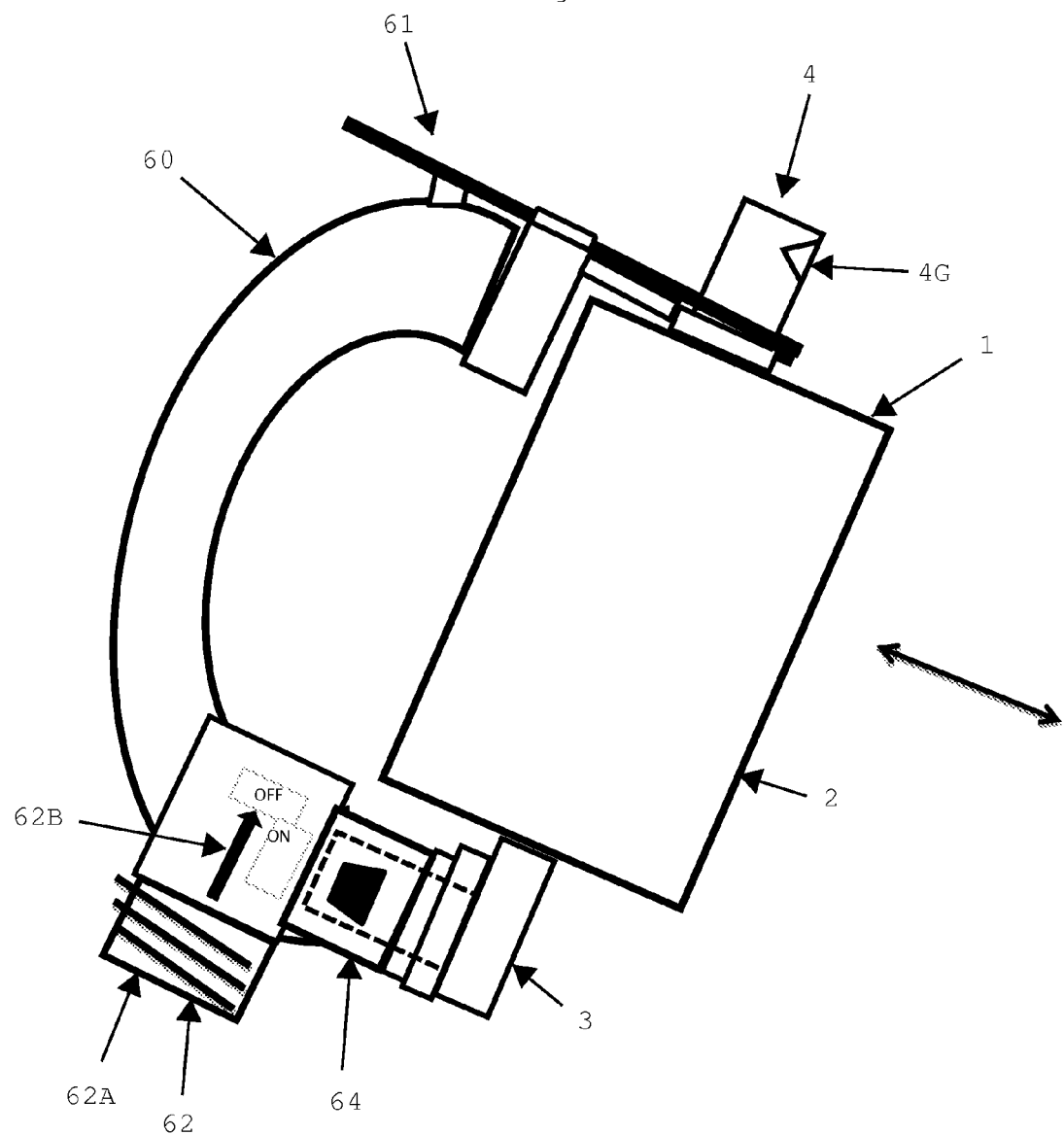

FLUID DISPENSER ATTACHED TO HANDLE

This is a Continuation-In-Part of patent application Ser. No. 12/212,551 filed Sep. 17, 2008 now U.S. Pat No. 8,167,174.

FIELD OF THE INVENTION

The present invention relates to inline fluid dispensers, particularly to inline fluid dispensers which can be attached to a handle.

BACKGROUND OF THE INVENTION

Athletes, travelers, and field support personnel often need to bring their water or fluid supply along as they conduct their daily activities. Hydration devices such as bladders, pouches, portable containers, or personal hydration systems such as the CamelBak™ or the Hydrastorm™ Hydration Pak are most often used to conveniently transport the water or fluid supply. These devices generally provide a container for holding the water or fluid supply as well as an attachment, such as a hose or bite valve, with which the user can draw on or suck on to extract the water or fluid supply.

These portable hydration devices range in size and shape from beverage pouches, such as U.S. Pat. Nos. 7,005,150 or 6,065,651, and small water bottles, such as U.S. Pat. No. 5,607,087 up to backpack sized sport hydration systems such as U.S. Pat. No. 4,526,298 and Published Patent Application US 2004/0262331 A1.

Attempts have been made to extend the volume of liquids that can be carried by providing multiple water carrying compartments such shown in U.S. Pat. No. 5,301,858.

Additionally attempts have been made to provide for dispensing multiple liquids simultaneously or solutions such as shown in U.S. Pat. Nos. 5,360,144,. 7,328,729, 7,306,117, and 5,799,873.

Devices such as bite valves see U.S. Pat. Nos. 5,601,207, 6,062,435, and 7,311,231 provide the mouthpiece or output device for drinking from the portable hydration devices.

One major drawback when using existing devices such as bites valves and other portable hydration devices is that fluid in the reservoirs of these devices can become contaminated when there is backflow into the reservoirs. For example, if the bite valve retains a portion of fluid after usage, the retained fluid may flow back into the reservoir and cause contamination.

Further, when users add additives to the reservoirs of generally known portable hydration systems, the entire hydration system must be thoroughly scrubbed, flushed, and sanitized to eliminate the additives prior to next use.

Additionally, when hydration system users blow into the bite valve it forces a combination of air and fluid back into the reservoir contaminating the hydration system.

One drawback of the use of portable hydration systems is that most often they are developed for use with a single source of water or fluid supply without providing the ability to independently introduce a supplemental solution into the flow of fluids.

The introduction of any beverage other than water may contaminate the reservoir, foul future water fillings and creates the necessity of additional sanitizing procedures for the user of the system.

Heretofore, controlled mixing of the water or fluid supply with supplemental solutions has been cumbersome and often leads to the supplemental solution contaminating the original water or fluid supply. Additionally, the components of the hydration system downstream from the fluid reservoir tend to either be permanently secured together, or else secured together via a tight friction fit that tends to be difficult to establish or release. Both of these structures provide effective fluid tight seals however, neither permits components to be quickly and repeatedly interchanged by the user.

A significant major draw back in the use of hydration systems has been that the introduction of fluids other than water to the fluid reservoir(s) tends to limit the life of the reservoir, increases the risk of contamination, fosters the growth of bacterium, and provides additional challenges to adequately cleanse and re-use the reservoir.

In military field operations and particularly in operations involving nuclear, biologic, and chemical (NBC) exposures and other hazardous environment exposures, thorough cleaning of the hydration system is essential. The typical cleansing procedure, however, is often cumbersome and ineffective. When supplemental solutions have been added to the hydration systems, the task of cleaning becomes exponentially more difficult because the additives have a tendency to settle into various sections of the hydration system and create contamination.

Due the issues presented with putting additives into the hydrations systems and then trying to clear the system of the additives, users are very often limited to the use of a single fluid. Since it's difficult to clean out additives, users sometimes carry multiple separate additive provides which are not connected to the hydration system. For example, a user may have a hydration system which provides water but relies on a separate independent juice pack to obtain flavored juices or vitamin supplements. Further, users often use external mixing containers such a cup to mix the supplement or carry multiple independent fluid and supplement sources as well as the water filled hydration system. This combination of elements creates additional carrying weight and can be awkward to manipulate.

The consumption of water alone is not sufficient to maintain proper electrolyte balance in a demanding and potentially hostile environment. Users clearly need an Inline Fluid Dispenser which can quickly and easily be attached to a hydration system and which allows the user to imbibe a wide selection of substances (such as supplemental electrolytes) without contaminating the hydration system.

SUMMARY OF THE INVENTION

The present invention presents an Inline Fluid Dispenser generally including a reservoir for containing reservoir contents RC, an entry-tubing adapter, an exit-tubing adapter, a fluid supply tube, and an activation system. Further, the Inline Fluid Dispenser is designed to function with a supply fluid SF, when available, and most uniquely, without a supply fluid SF if necessary. The ease of use and installation, and a hands free way to replenish lost nutrients or consume additional nutrients allows Inline Fluid Dispenser users the ability to maintain high performance in their activities.

An alternate embodiment of the present invention further includes metering channels and a base adapter cone.

Another alternate embodiment of the present invention includes additional components and/or operation functions for stopping fluid flow.

Another alternate embodiment of the present invention includes multiple reservoir chambers.

Another alternate embodiment of the present invention includes multiple reservoir chambers and activator tube metering orifices.

Another alternate embodiment of the present invention includes an adjustable fluid router.

Another alternate embodiment of the present invention includes a refillable reservoir.

Another alternate embodiment of the present invention includes a solution cartridge.

Another alternate embodiment of the present invention includes wherein the solution cartridge forms the reservoir.

Another alternate embodiment of the present invention includes multiple solution cartridges.

Another alternate embodiment of the present invention includes wherein the multiple solution cartridges form the reservoir.

Another alternate embodiment of the present invention includes as self-constricting reservoir.

Another alternate embodiment of the present invention includes a reservoir using a compression sleeve Another alternate embodiment of the present invention includes a reservoir having a fill-tube and reservoir balloon.

Numerous other advantages and features of the present invention will become apparent from the following detailed description of the invention, from the claims, and from the accompanying drawings.

BRIEF DESCRIPTION OF THE DRAWINGS

The invention is explained in the following description in view of the drawings that show:

FIG. 6A is a view of the bottom half of balloon type reservoir embodiment

FIG. 6B is a view of top half of balloon type reservoir embodiment.

FIG. 7B is a view indicating the metering orifice alignment path.

FIG. 7C is a view of the metering orifices aligned with one-way flap valve FIG. 7D is an enlarged detail view showing alignment of orifices and one-way flap valve.

FIG. 11A is a front view of the supply tube and actuator tube with multiple positions for multiple reservoirs and shows the reservoir chamber partition seal.

FIG. 11B is a partial view showing activator tube raised to show communication with reservoir contents is established.

FIG. 11C is a front view showing the reservoir chamber partition seal.

FIG. 8 is a view of fluid flow pattern with the actuator tube in the open position.

FIG. 12A is a top view of orifices.

FIG. 12B is a side view of the fluid supply tube metering channel.

FIG. 12C is a front view of the fluid supply tube metering channel.

FIG. 16 is a front view of an activation system employing a fluid router.

FIG. 17 is a front view of an activation system employing a fluid router.

FIG. 18A is an exploded front view of a refillable Inline Fluid Dispenser of the present invention.

FIG. 18B is an exploded side view showing orifice alignments and the one way flap valve.

FIG. 29A is a view of the compression/insulation sleeve

FIG. 29B presents details of the compression sleeve.

FIG. 29C presents additional compression sleeve components.

FIG. 29E presents a compression sleeve having a pocket.

FIG. 29D presents a single sheet compression sleeve.

FIG. 30B presents an IFD attached to a handle.

DETAILED DESCRIPTION OF THE INVENTION

Figure 2A:
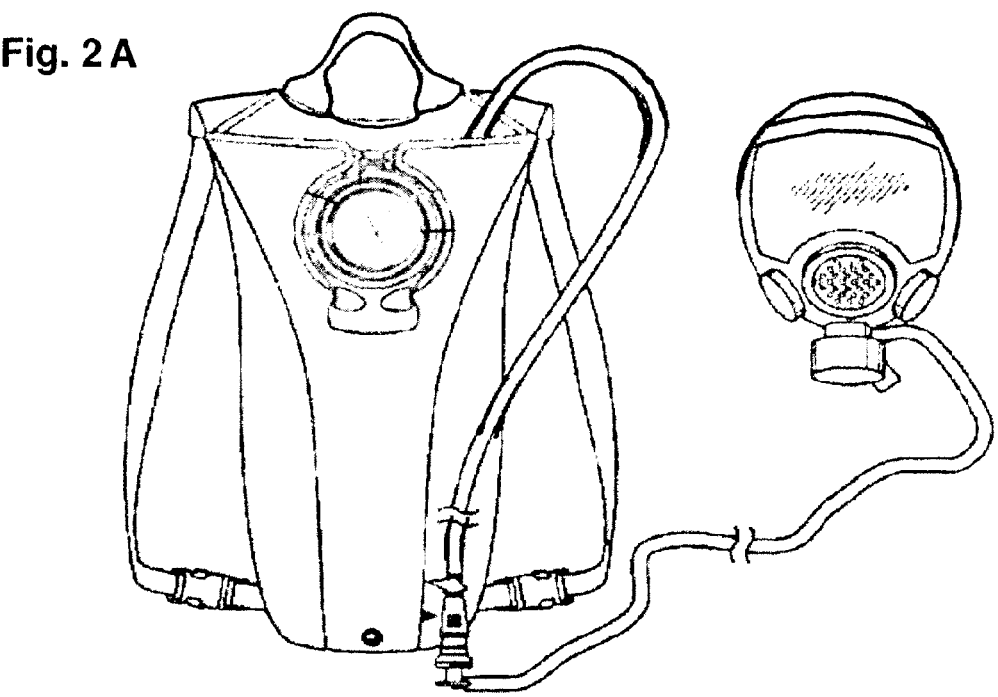
FIG. 2A is a hydration system set up for use with protective mask.
Figure 3A:
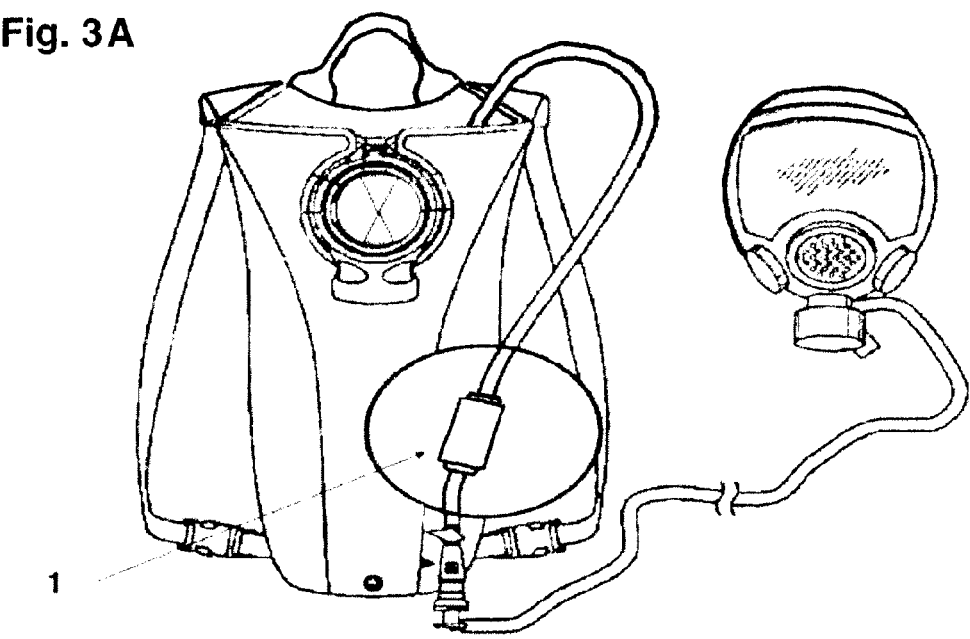
FIG. 3A is a hydration system set up for use with protective mask with an Inline Fluid Dispenser of the present invention installed.
Figure 3B:
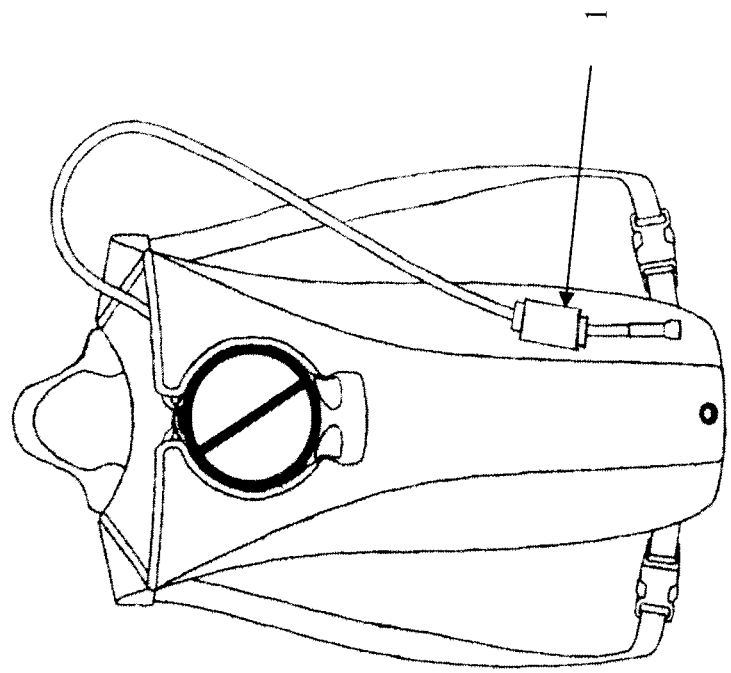
FIG. 3B is a hydration system set up with an Inline Fluid Dispenser of the present invention installed for use with bite valve.
Figure 2B:
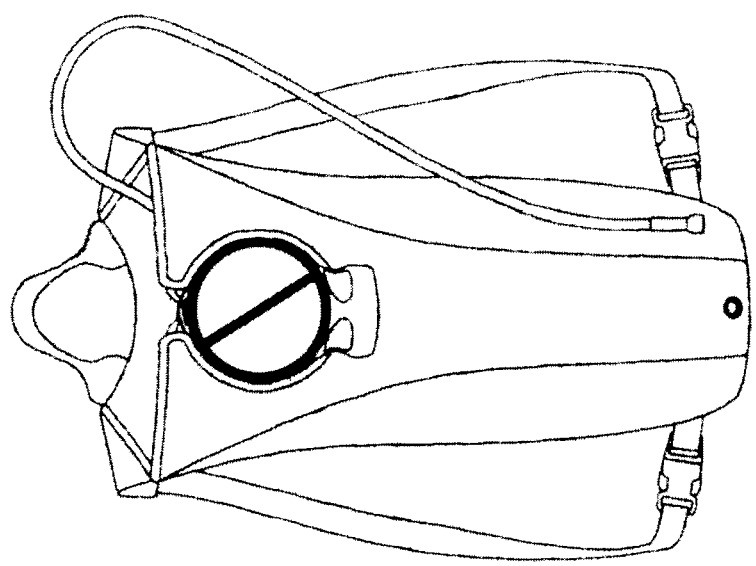
FIG. 2B is a hydration system set up with a bit valve.

Referring to the drawings, the present invention is an Inline Fluid Dispenser and a method for inline fluid dispensing. FIG. 2A presents a traditional hydration system used in conjunction with a protective gas mask. As generally presented in FIG. 3A the Inline Fluid Dispenser 1 of the present invention is shown installed inline with a protective gas mask. FIG. 2B presents a hydration pack having a bite valve. FIG. 3B presents a hydration pack having a bite valve with the Inline Fluid Dispenser installed inline between the fluid supply and the bite valve. The Inline Fluid Dispenser 1 of the present invention includes a reservoir 2, reservoir contents RC, an entry-tubing adapter 3, an exit-tubing adapter 4, a fluid supply tube 5, and an activation system 6, wherein the Inline Fluid Dispenser is operable with a supply fluid SF.

In general operation, supply fluids such as water or other liquid or quasi-liquid solutions is provided by personal hydration packs or a fluid source. The supply fluid SF enters the Inline Fluid Dispenser via the entry-tubing adapter and exits the Inline Fluid Dispenser via the exit tubing adapter. Within the Inline Fluid Dispenser, the activation system manages the mixing of the supply fluid with the initial contents of the reservoir so that any desired combination of reservoir contents and supply fluid flows together out of the exit-tubing adapter.

Elements of the Preferred Embodiment

In the preferred embodiment, as shown in FIGS. 1, 7A, 8, 9, 12A, 12B, 12C, 13, and 14 the Inline Fluid Dispenser 1 generally includes a reservoir 2 for holding reservoir contents RC, an entry-tubing adapter 3, an exit-tubing adapter 4, a fluid supply tube 5, and an activation system 6. Further, the Inline Fluid Dispenser is designed to function with a supply fluid SF, when available or without a supply fluid SF if necessary.

The preferred activation system 6 includes an activator tube 9, an activator tube crown 11, activator tube threads 12 surrounding at least a portion of the activator tube 9, and activator tube stops 13. The activator tube 9 extends from the activator tube crown 11. The activator tube 9 further includes a central tube chamber 9c, a proximal end 9d adjacent the activator tube crown 11 and a distal end 9e positioned at the tip of the activator tube away from the activator tube crown 11. The activator tube includes a column shaped segment 9a may include activator tube metering orifices 9b. The activator tube metering orifices 9b allow fluid communication between the reservoir 2 and the activator central tube chamber 9c. The activator tube metering orifices 9b can be a variety of shapes, such as oval, triangular, round, or saw-toothed, wherein the shape of the activator tube metering orifice 9b affects the fluid flow through the activator tube metering orifices 9b as described further herein. The activator tube stops 13 are positioned on the activator tube crown 11 to limit the travel of the activator tube 9.

Figure 13:
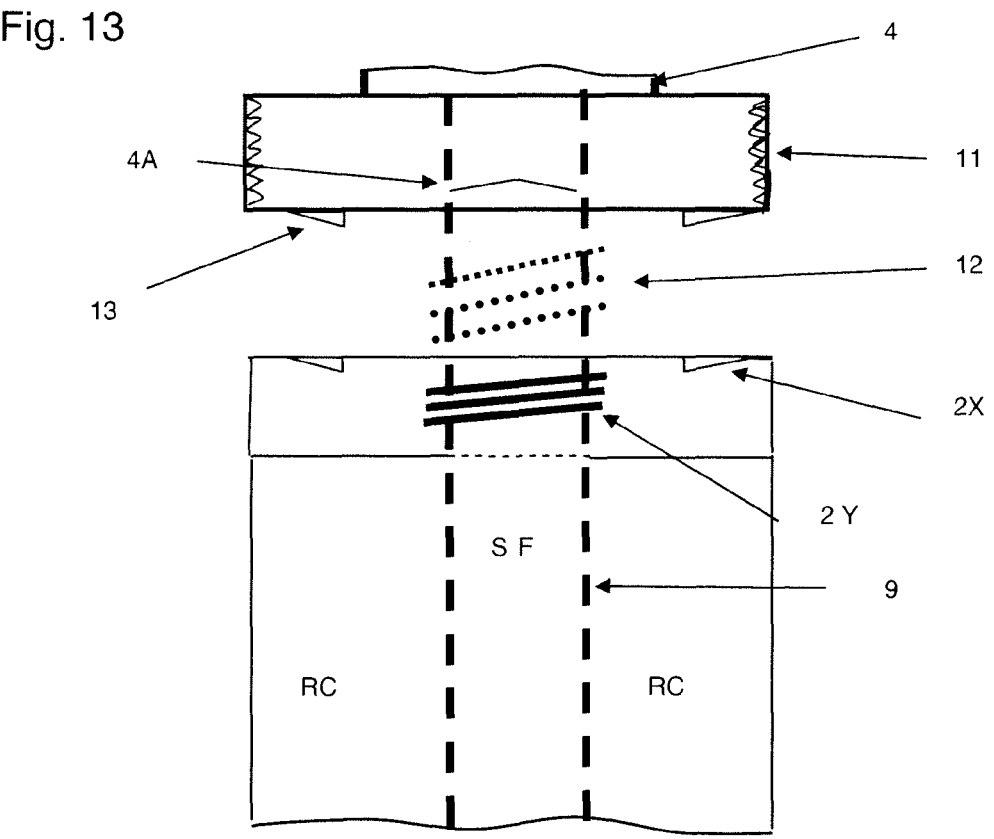
FIG. 13 is a front exploded view showing the actuator crown.
Figure 14:
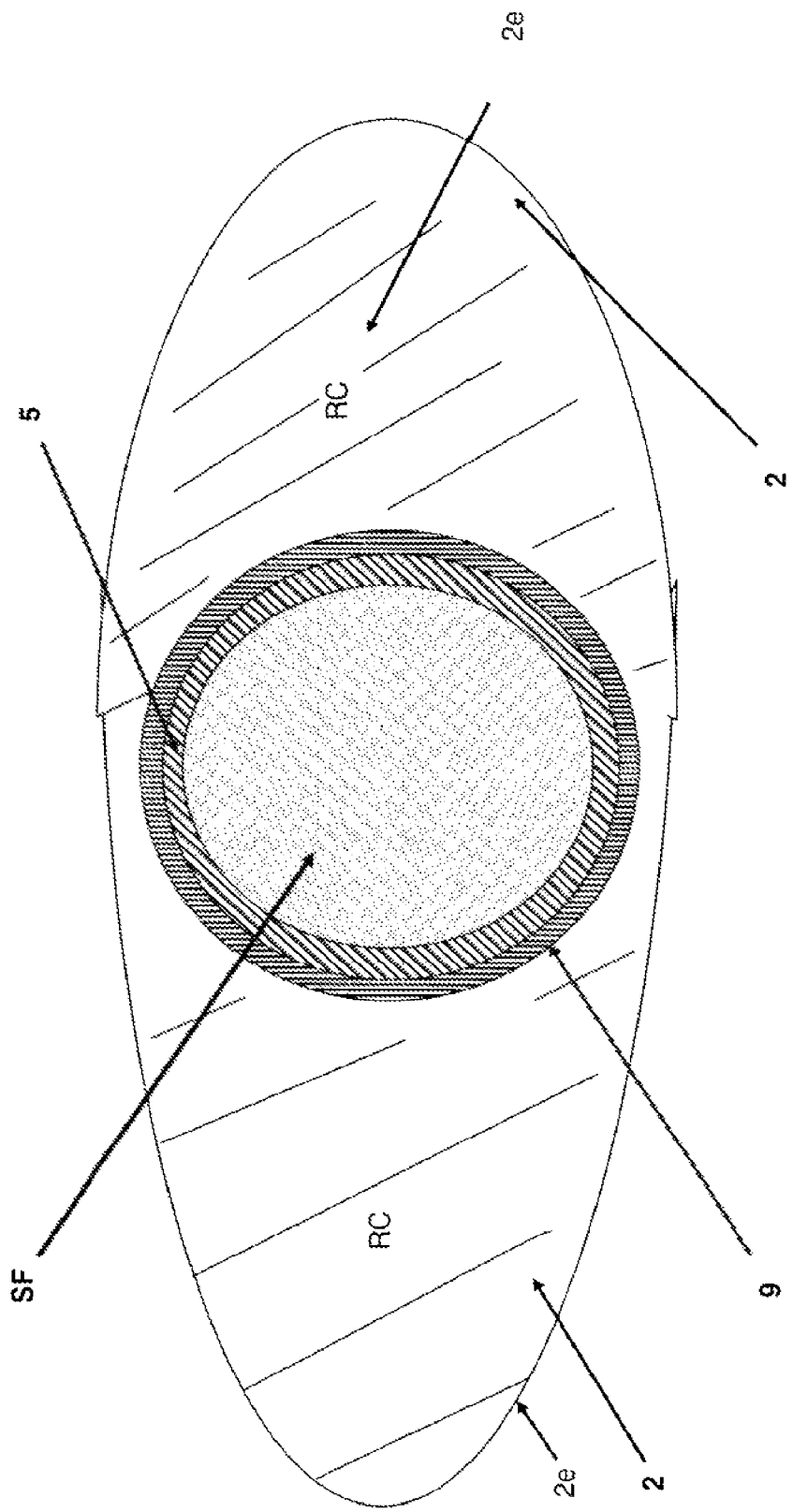
FIG. 14 is a cross-section view of a reservoir chamber, activator tube, and supply tube.

As shown In FIG. 13, the tube crown 11 includes activator stops 13 extending from the activator tube crown 11.

The preferred embodiment includes a reservoir 2 having at least one reservoir chamber 18, which is configured to contain fluids, liquids, gels, pastes, pellets, powders, gases, or other substances having material form. The reservoir 2 includes a bottom end 2a that abuts the entry-tubing adapter 3 and a top end 2b that abut the exit-tubing adapter 4 and a reservoir shell body 2e forming the outer circumference of the reservoir. The reservoir 2 is positioned to surround the activator tube 9. The reservoir shell body 2e can be comprised of a rigid or flexible material, such as plastic, thin foil, multi-layered films, or combinations thereof, wherein the flexible material allows the volume of the reservoir to increase or decrease. As also shown In FIG. 13, the reservoir 2 further includes reservoir stop receivers 2x provided on the reservoir top end 2b and positioned to receive the activator tube stops 13. The reservoir 2 includes reservoir threads 2y provided at on the reservoir top end 2b and positioned to receive the activator tube threads 12.

The reservoir volume RV is determined by the shape taken by the enclosure formed within the reservoir shell body 2e. As the interior walls of the reservoir shell body 2e move away from each other, the reservoir volume RV increases. As the interior walls of the reservoir shell body 2e move towards each other, the reservoir volume RV decreases. Generally, when substance is drawn from the reservoir 2, such as when the user sucks/draws on or otherwise provides a negative pressure to the Inline Fluid Dispenser 1, the interior walls of the reservoir shell body 2e move towards each other as the substance is depleted. The volume of the reservoir shell body 2e changes (reduces) as the reservoir contents RC flow into the supply tube 5 thereby providing a volume reducing reservoir 2. The material properties of the reservoir shell body 2e determine its malleability and its ability to deform in conjunction with the loss of reservoir contents RC. The reservoir shell body 2e provides the outer structure to support the reservoir contents RC and appropriately contain them within the reservoir 2. It is envisioned the reservoir shell body 2e can be comprised materials including flexible resins, heat sealed sheets, laminated sheets, and be formed as a single sheet or sheet layers.

Figure 1:
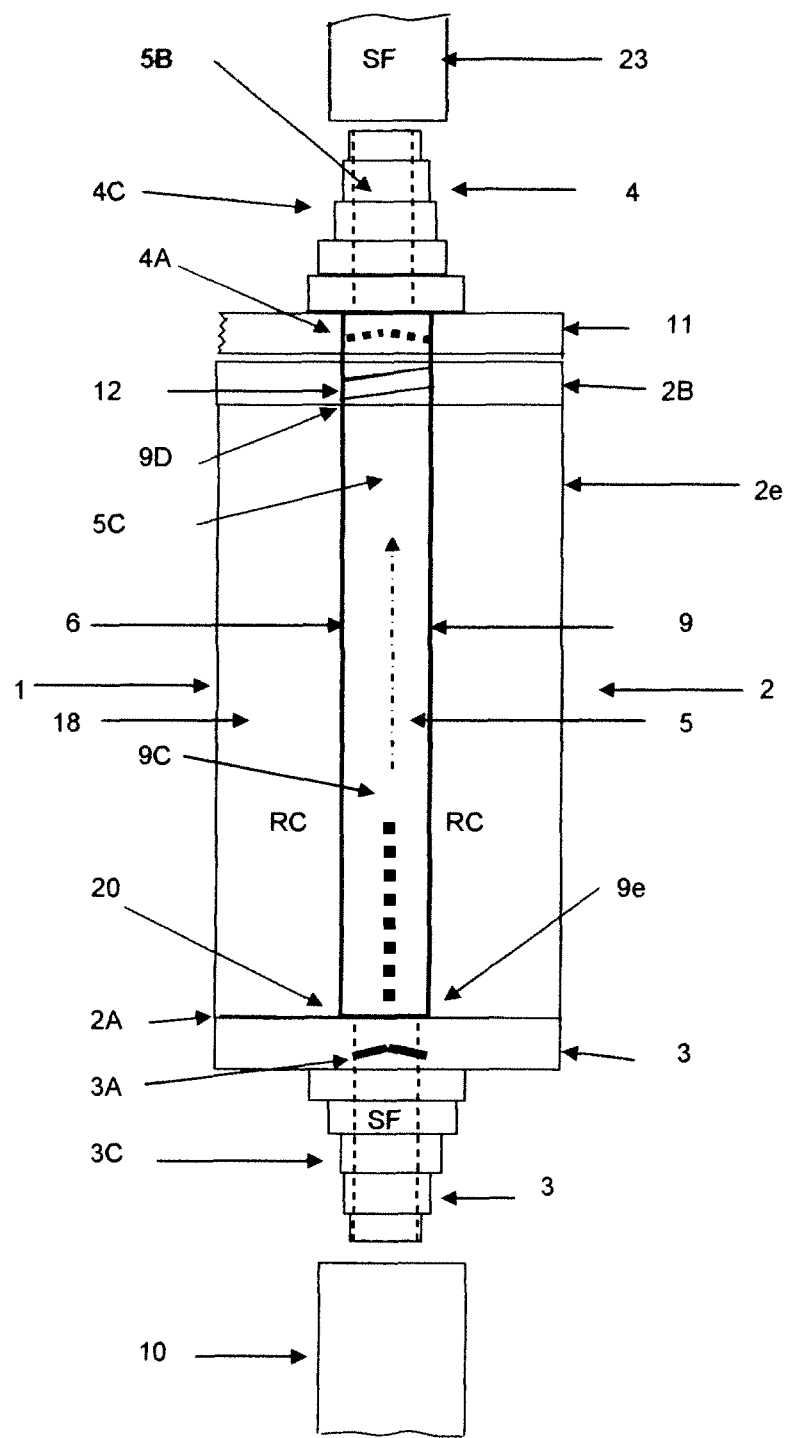
FIG. 1 is a general view of the Inline Fluid Dispenser of the present invention.

The preferred embodiment includes an entry-tubing adapter 3 positioned at the reservoir bottom end 2a and an exit tubing adapter 4 positioned at the reservoir top end 2b. The entry-tubing adapter 3 includes an entry-flow valve 3a and the exit-tubing adapter 4 includes an exit-flow valve 4a. The flow valves are one-way flow valves that prohibit fluid back-flow. The entry-tubing adapter 3 and the exit-tubing adapter 4 each include a hose or tubing adapter plug, such as a generally known universal adapter or quick-connect adapter, to allow a hose or tubing to be attached to the Inline Fluid Dispenser 1. Within the Inline Fluid Dispenser 1 the activator tube distal end 9e can be positioned to abut the entry-tubing adapter 3, as shown in FIG. 1, such that a fluid seal 20 is formed which prevents fluid in the reservoir 2 from flowing into the activator central tube chamber 9c. The proximal end of the activator tube 9 fixedly abuts the exit tubing adapter 4.

Figure 9:
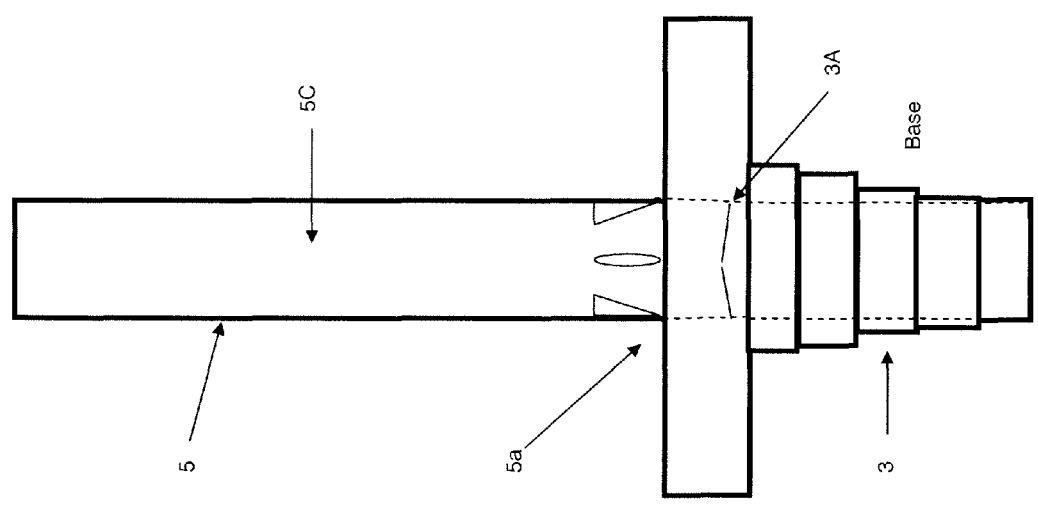
FIG. 9 is a front view of the combination of the entry tubing adapter (having a one-way check valve), and the fluid supply tube (having orifices).

The preferred embodiment includes a fluid supply tube 5 having a fluid supply tube first end 5a, as shown in FIG. 9, which interfaces with the entry tubing adapter 3, which in-turn interfaces with a fluid source/fluid input device 10. The fluid supply tube 5 further includes a fluid supply tube second end 5b which interfaces with the exit-tubing adapter 4. The fluid supply tube 5 further includes a column shaped segment 5c connecting the fluid supply tube first end 5a and the fluid supply tube second end 5b together. The fluid supply tube column shaped segment 5c includes metering holes 5d around a fluid supply tube central tube chamber 5e. A variety of metering holes 5d positions or locations are employed which include a single metering hole 5d, multiple metering holes 5d around the fluid supply tube 5 which are positioned at the same distance between the fluid supply tube first end 5a and the fluid supply tube second end 5b, or multiple metering holes 5d around the fluid supply tube 5 which are positioned at varying distances between the fluid supply tube first end 5a and the fluid supply tube second end 5b. Any desired combination of the preceding metering holes 5d positions or locations can be applied as needed for the specific fluid flow and fluid mixing requirements. The metering holes 5d allow fluid communication between the reservoir 2, the fluid supply tube central chamber 9e, and the activator tube metering orifices 9b. The metering holes 5d can be a variety of shapes, such as oval, triangular, round, or saw-toothed, wherein the shape of the metering holes 5d affects the fluid flow through the metering holes 5d as described further herein. The activator tube 9 is removably mounted concentrically over the fluid supply tube 5 and is positioned between the fluid supply tube 5 and the reservoir 2.

Additionally, as shown in FIGS. 7B, 7C, and 7D the activator tube 9 may include a flap 9g that operates as a one-way valve, such as micro-valve. The activator tube flap 9g is positioned over an activator tube aperture 9h provided on the activator tube 9 near the activator tube crown 11. The activator tube aperture 9h allows fluid communication between the activator tube 9 and the reservoir 2.

Further, the fluid supply tube 5, as shown in FIG. 7D, includes a fluid supply tube aperture 5h provided on the fluid supply tube 5 near the fluid supply tube second end 5b. The fluid supply tube aperture 5h extends into the fluid supply tube central chamber 5e. The fluid supply tube aperture 5h is positioned to be alignable with the activator tube aperture 9h.

When the activator tube aperture 9h is aligned with the fluid supply tube aperture 5h, such as by rotation of the activator tube 9 along the activator tube path 9i, fluid communication between the reservoir 2 and the fluid supply tube central chamber 5e is enabled or inhibited by activator tube flap 9g. For example, when the apertures are aligned and the pressure or force on the reservoir 2 side of the flap 9g is lower than the pressure or force on the fluid supply tube central chamber 5e side of the flap 9g, fluid can flow from the fluid supply tube central chamber 5e into the reservoir 2.

In an exemplary usage, when there is a powder or fluid substance in the reservoir 2 which asserts a lower pressure on the activator tube flap 9g than is provided on the other side of the activator tube flap 9g by the fluid (Supply Fluid or Mixed Fluid) flowing through the fluid supply tube central chamber 5e, then a portion of the fluid in the fluid supply tube central chamber 5e will also flow into the reservoir 2.

Operation of the Preferred Embodiment in Closed Position

In the closed position of the preferred embodiment, as shown in FIG. 1, supply fluid SF, such as water or other liquid or quasi-liquid solutions, is provided by the fluid source/fluid input device 10 attached to the entry tubing adapter 3. In the closed position the activator tube distal end 9e is positioned to abut the entry-tubing adapter 3 such that a fluid seal 20 is formed which prevents the contents of the reservoir 2 from flowing into the activator central tube chamber 9c. Instead, when the user sucks/draws on the fluid output valve, supply fluid SF flows through the one-way entry flow valve 3a, through the supply tube 5, through the one-way exit flow valve 4a in the exit tubing adapter 4, to a fluid output device 23. The fluid output device 23 is generally a fluid-handling component such as a hose, tubing, or a bite-valve device.

In the closed position, the solution of supply fluid that enters the Inline Fluid Dispenser 1 is the same solution of supply fluid that exits the Inline Fluid Dispenser 1.

Operation of the Preferred Embodiment in Activated Position

Figure 7A:
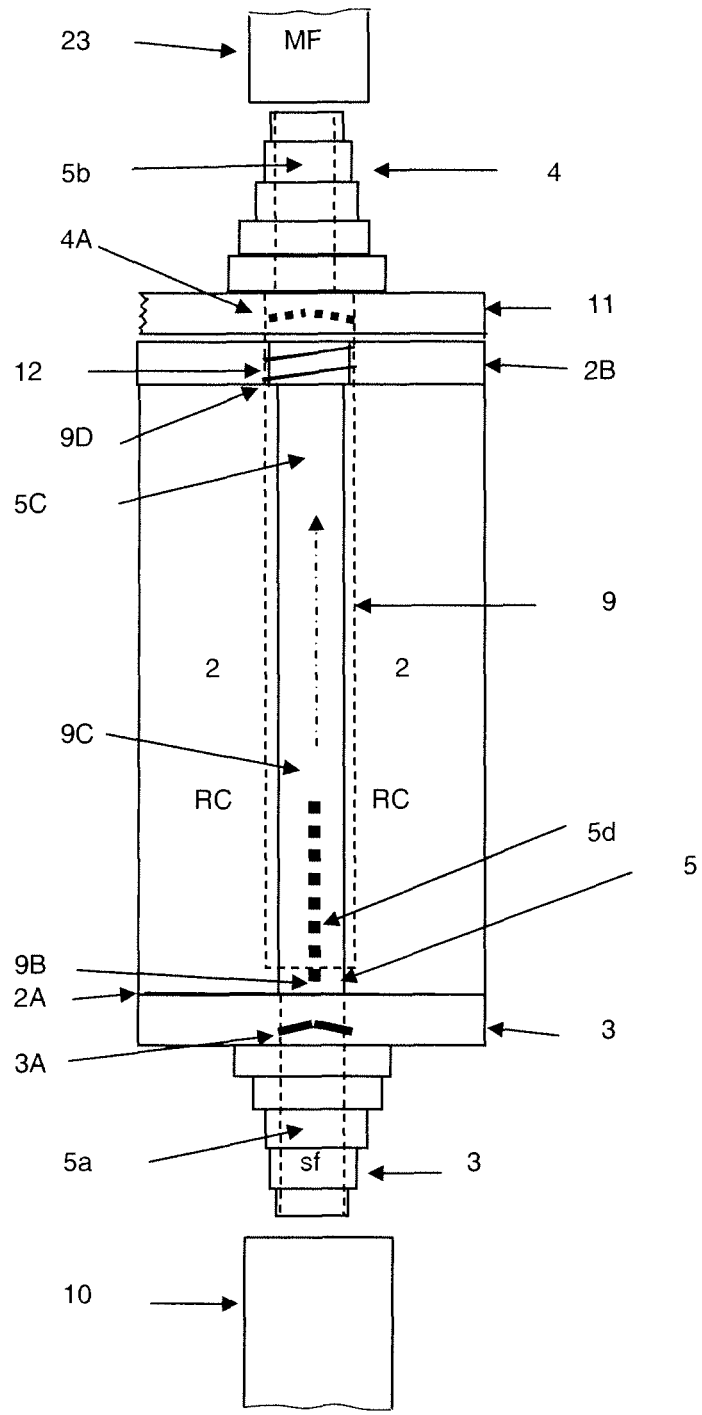
FIG. 7A is a view of the activator tube in the open position.
Figure 10:
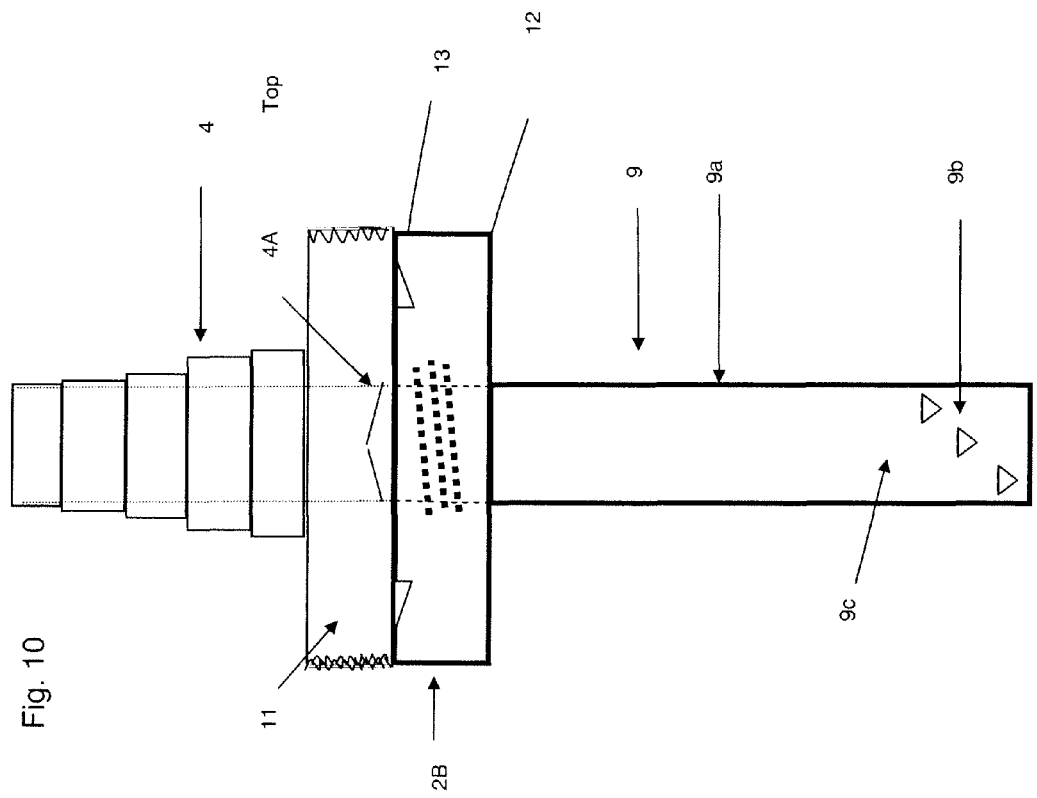
FIG. 10 is a front view of actuator tube with the movable crown, threads, stops, and orifices

In the Activated or open position of the preferred embodiment, as shown in FIG. 7A, supply fluid SF, such as water or other liquid or quasi-liquid solutions, is provided to the fluid supply tube 5 by a fluid source 10 attached to the entry-tubing adapter 3 when the user sucks on the fluid output device 23 or otherwise provides a negative pressure at the fluid output device 23 and fluid can also flow from the reservoir 2 into the fluid supply tube 5.

To activate the Inline Fluid Dispenser 1, the user rotates the activator tube crown 11, which raises the activator tube distal end 9e such that the fluid seal 20, which prevents the contents of the reservoir 2 from flowing into the activator central tube chamber 9c, is no longer formed, as shown in FIG. 8. This allows the reservoir contents RC from the reservoir 2 to flow into the activator central tube chamber 9c and mix with the supply fluid SF flowing through the fluid supply tube central chamber 5e and as a result a combined solution of the supply fluid SF and reservoir contents RC exits the Inline Fluid Dispenser 1 as a mixed fluid MF through the supply tube 5 by passing through the one-way exit flow valve 4a in the exit tubing adapter 4, and out to the fluid output device 23.

More specifically, as shown in FIG. 8, when the activator tube 9 is raised, it slides upward along the fluid supply tube 5. When the activator tube distal end 9e slides upward past the fluid supply tube metering holes 5d fluid communication between the reservoir contents RC and the fluid supply tube central tube chamber 5e is established. The reservoir contents RC of the reservoir chamber 18 mix with the supply fluid SF that is flowing through the supply tube 5 forming a mixed fluid MF that flows towards the fluid output device 23 and on to the user.

Due to the scientific principals such as the Venturi Effect, as the user sucks on the fluid output device 23 or otherwise provides a negative pressure at the fluid output device 23, supply fluid SF generally flows through the fluid supply tube 5. With the supply fluid (SF) flowing and the Inline Fluid Dispenser 1 in the activated position the reservoir contents RC are controllably dispersed into the fluid supply tube 5 through the fluid supply tube metering holes 5d. The fluid supply tube metering holes 5d are positioned circumferentially around the fluid supply tube 5. This allows the contents of the reservoir 2 to essentially be injected into the fluid supply tube 5 at multiple locations.

The controlled dispersion of the reservoir contents RC into the fluid supply tube 5 is an essential feature of the instant invention. Various embodiments of this preferred invention are directed to improved methods and techniques for controlling the mixture of reservoir contents RC and supply fluid SF en-route to the output device 23. Controlled dispersion of the reservoir contents RC, as presented herein include methods which apply techniques which meter, calculate, or deliberately dispense quantities of reservoir contents RC. These may include arrangements of holes, ports, reeds, and orifices as well also supplemental elements such as remotely operated valves, manually operated mechanisms, electronically operated mechanisms, and mechanisms shaped to provide controlled dispersion—such as cams and profiles.

Figure 28:
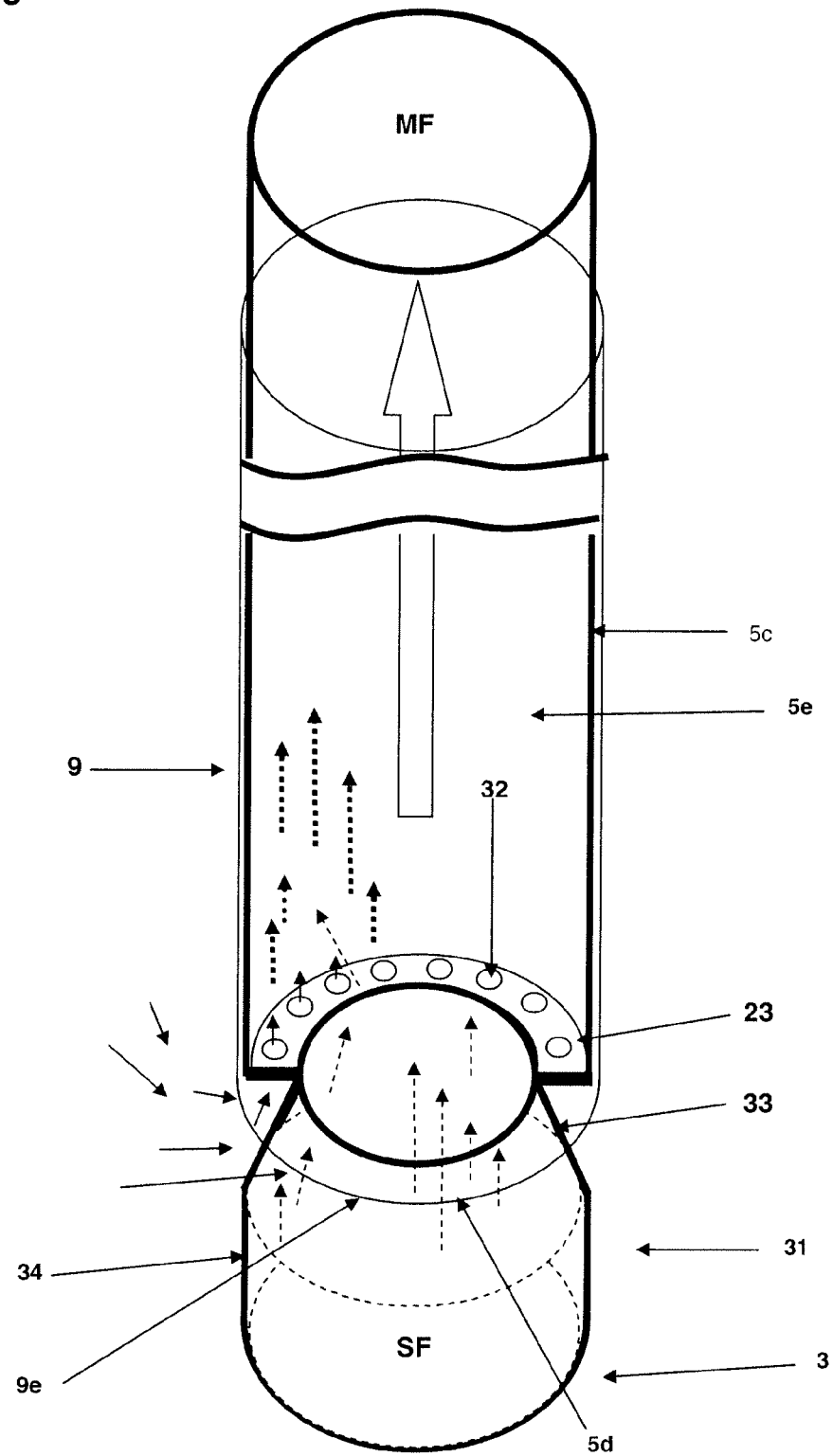
FIG. 28 is a fluid supply tube embodiment indicating further details.

Structurally, the fluid supply tube metering holes 5d extend from the outer surface of the fluid supply tube 5 inward towards the fluid supply tube central tube chamber 5e and may be angled within a 180 degree range along a path 5f, as shown in FIGS. 12B, 12C, and 28, which extends upward towards the fluid supply tube second end 5b.

As long as the activator tube distal end 9e is positioned above the fluid supply tube metering holes 5d reservoir contents RC will continually flow into the fluid supply tube 5 until the reservoir contents RC are depleted. Once the reservoir contents RC are depleted, the solution that flows to the fluid output device 23 and on to the user will only be the supply fluid SF.

Generally, the user attaches the Inline Fluid Dispenser 1 to an existing hydration system and drinks supply fluid until the user activates the Inline Fluid Dispenser 1 unit. When activated, the Inline Fluid Dispenser 1 unit injects the contents of the Inline Fluid Dispenser reservoir 2 into the supply fluid and provides the user a mixed fluid MF which is a combination of the supply fluid SF and the reservoir contents RC. Once the reservoir contents RC are depleted the Inline Fluid Dispenser 1 resumes the delivery of supply fluid. Importantly, the Inline Fluid Dispenser 1 can deliver supply fluid before being activated, dispense mixed fluid MF upon activation, and automatically resume delivering only supply fluid SF once the reservoir contents RC have been depleted or exhausted. The only action by the user is the initial activation of the Inline Fluid Dispenser 1. Until the user activates the Inline Fluid Dispenser 1 there is no interruption of supply fluid SF and the Inline Fluid Dispenser 1 does not distract from the user's normal activities. Once activated, the Inline Fluid Dispenser 1 operates fully automatically and injects the reservoir contents RC into the supply tube 5 with no further action from the user. As a check valve, the entry-flow valve 3a prevents fluid already in the fluid supply tube 5 from flowing backwards through the entry-tubing adapter 3 into the fluid supply. The exit-flow valve 4a, also a check valve, prevents fluid already in the fluid output device 23 from flowing backwards through the exit-tubing adapter 4 and into the fluid supply. With the activator tube 5 in the open/activated position the system is an open system with one-way supply fluid flow SF and the reservoir contents RC can mix with the supply fluid SF.

The Inline Fluid Dispenser 1 attaches to the fluid supply tube 5 and can be used by anyone who needs to carry their own fluid supply. As shown in the accompanying figures, the Inline Fluid Dispenser 1 can be attached anywhere on the fluid supply tube of a personal hydration system, also see FIG. 3A and FIG. 3B. The Inline Fluid Dispenser 1 is generally attached downstream from the fluid reservoir and the one-way check valves in the Inline Fluid Dispenser 1 ensure no supply fluid, or modified supply fluid can flow back into the hydration system reservoir from the Inline Fluid Dispenser 1. This essentially eliminates the risk of contaminating the hydration system reservoir and greatly minimizes the cleaning and sterilization requirements of the hydration system.

The Inline Fluid Dispenser 1 unit (IFD Unit) is easily installed utilizing by using generally known attachment devices which connect to the entry tubing adapter and the exit tubing adapter and the user has a minimum amount of addition weight to carry.

Additional advantages of the Inline Fluid Dispenser 1 include it may be small (about the size of a modern mobile phone or smaller) or large (unlimited), it is easy to use with very few moving parts, it installs in moments (not minutes), only needs to be attached once or can be removably attached, does not "foul" or contaminate the water/fluid supply, it is a closed system (only fluids and substances within the system are consumed), the IFD unit reservoir contents do not interact with the water/fluid supply except when initiated by user, the IFD unit can be of a permanent, disposable or reusable variety, the IFD unit can be quickly attached prior to field operations, and the IFD unit can use multiple solutions simultaneously such as combinations of Electrolyte/Caffeine/Protein/Fiber.

Alternate Embodiment 1—Metering Channels and Base Adapter Cone

In an alternate embodiment of the Inline Fluid Dispenser 1, as shown in FIG. 28, the fluid supply tube 5 includes a cone shaped section 31 which extends towards the fluid supply tube second end 5b on one end and which abuts entry tubing adapter 3 at the other end of the cone shaped section 31. The outer diameter of the cone shaped section 31 includes straight segments 34 and a tapered segment 33. For the tapered segment 33, the outer diameter increases in the direction of the entry tubing adapter 3 until the outer diameter of the cone shaped section 31 is substantially the same as the inner diameter of the activator tube 9. The tapered segment 33 of the outer diameter of the cone shaped section 31 directs fluid flow to the fluid supply tube 5 where metering channels 32, which extend into the fluid supply tube central tube chamber 5e, are provided so that fluid flowing along the tapered segment 33 of the outer diameter of the cone shaped section 31 is directed into the metering channels 32 and from there, on into the fluid supply tube central tube chamber 5e. The activator tube 9 is positionable over the cone shaped section 31 and can abut the entry tubing adapter 3, such that a fluid seal 20 can be formed to prevent the contents of the reservoir 2 from flowing into the fluid supply tube central tube chamber 5e until desired. The metering channels 32 are provided in a variety of patterns which are selected to provide the desired fluid flow characteristics. For example, as shown in FIG. 12A, some of the metering channels 32 are spaced further apart than other metering channels 32. The arrangement of metering channels 32 influences the fluid pressure and fluid mixing as fluid flows from the reservoir 2 into the fluid supply tube central tube chamber 5e. The pattern of the arrangement of the metering channels 32 can also effect the overall shaped and size selected for the fluid supply tube 5, the interior of the fluid supply tube, the activator tube 9, and the interior of the activator tube. The Inline Fluid Dispenser 1 may have a single metering channel 32, or multiple metering channels 32.

When the activator tube 9 is raised it slides upward along the fluid supply tube 5. When the activator tube distal end 9e slides upward past the tapered segment 33 where the outer diameter of the cone shaped section 31 is less than the inner diameter of the activator tube 9, fluid communication between the reservoir contents RC and the fluid supply tube central tube chamber 5e is established. Fluid flows up the tapered segment 33 of the cone shaped section 31 into the metering channels 32 and on into the fluid supply tube central tube chamber 5e.

As indicated in FIG. 8, the reservoir contents RC of the reservoir chamber 18 mix with the supply fluid SF that is flowing through the supply tube 5 forming a mixed fluid MF that flows to the fluid output device 23 and on to the user. Note, in the embodiment shown in FIG. 8, there is no cone shaped section 31, and the metering channels 32 are provided at the outer surface of the fluid supply tube 5 and extend into the fluid supply tube central tube chamber 5e at an angle from the outer surface of the fluid supply tube 5. The arrangement of metering channels 32 still influences the fluid pressure and fluid mixing as fluid flows from the reservoir 2 into the fluid supply tube central tube chamber 5e even in the absence of the cone shaped section 31.

This embodiment provides the injection of reservoir contents into the supply fluid, for example electrolytes, stimulants, and energy solutions which usually require shaking or stirring when mixed with a supply fluid (such waster) benefit from enhanced mixing provided by the arrangement of the metering channels.

Alternate Embodiment 2—Stopping Reservoir Flow

In an alternate embodiment, the flow of the reservoir contents RC into the fluid supply tube 5 can be stopped by rotating the activator tube crown 11 to the closed position which lowers the activator tube distal end 9e such that it abuts the entry-tubing adapter 3 and a fluid seal 20 is again formed. With the seal 20 reestablished, the user will return to drawing only supply fluid SF when the user sucks/draws on the fluid output device 23 (such as a bite valve) or otherwise provides a negative pressure at the fluid output device 23. As a check valve, the entry-flow valve 3a prevents fluid already in the fluid supply tube 5 from flowing backwards through the entry-tubing adapter 3 into the supply fluid. The exit-flow valve 4a, also a check valve, prevents fluid already in the fluid output device 23 from flowing backwards through the exit-tubing adapter 4 into the supply fluid. With the activator tube 9 in the closed position the system is a closed system with one-way supply fluid flow SF only and the reservoir contents RC do not mix with the supply fluid SF.

Users that wish to conserve reservoir contents and consume them on-demand can easily stop the reservoir content flow as presented in this embodiment without disrupting the flow of water/supply fluid.

Alternate Embodiment 3—Multiple Reservoir Chambers

In an alternate embodiment of the Inline Fluid Dispenser 1, as shown in FIGS. 11A, 11B, 11C, and 15, reservoir 2 further includes a plurality of chambers 18a, 18b and a partition seal 30 which separates each of the reservoir chambers 18a, 18b from each other. It is understood there can be an unrestricted number of combinations of reservoir chambers 18 and corresponding fluid supply tube partitions 30 and the embodiment presently disclosed is merely exemplary.

The partition seal 30 includes a partition seal column shaped segment 30c connecting a partition seal first end 30a and a partition seal second end 30b together. The partition seal column shaped segment 30c includes metering ports 30d around a central partition seal chamber 30e. A variety of partition seal metering port 30d positions or locations are employed which include a single partition seal metering port 30d at a single location, a plurality of partition seal metering ports 30d around the partition seal 30 which are all positioned the at the same distance between the partition seal first end 30a and a partition seal second end 30b, or a plurality of partition seal metering ports 30d around the partition seal 30 which are each positioned at a unique distance between the partition seal first end 30a and a partition seal second end 30b. Any desired combination of the preceding partition seal metering port 30d positions or locations can be applied as needed for the specific fluid flow and fluid mixing requirements.

The partition seal metering ports 30d allow fluid communication between the respective reservoir chamber 18, the fluid supply tube central chamber 5e, and the activator tube metering orifices 9b. The partition seal metering ports 30d can be a variety of shapes, such as oval, triangular, round, or saw-toothed, wherein the shape of the partition seal metering ports 30d affects the fluid flow through the partition seal metering ports 30d as described further herein. The partition seal metering ports 30d presents areas where there is an absence of the partition seal 30 and can have any shape, including oval, circular, square, translational path, or curvilinear path.

Figure 15:
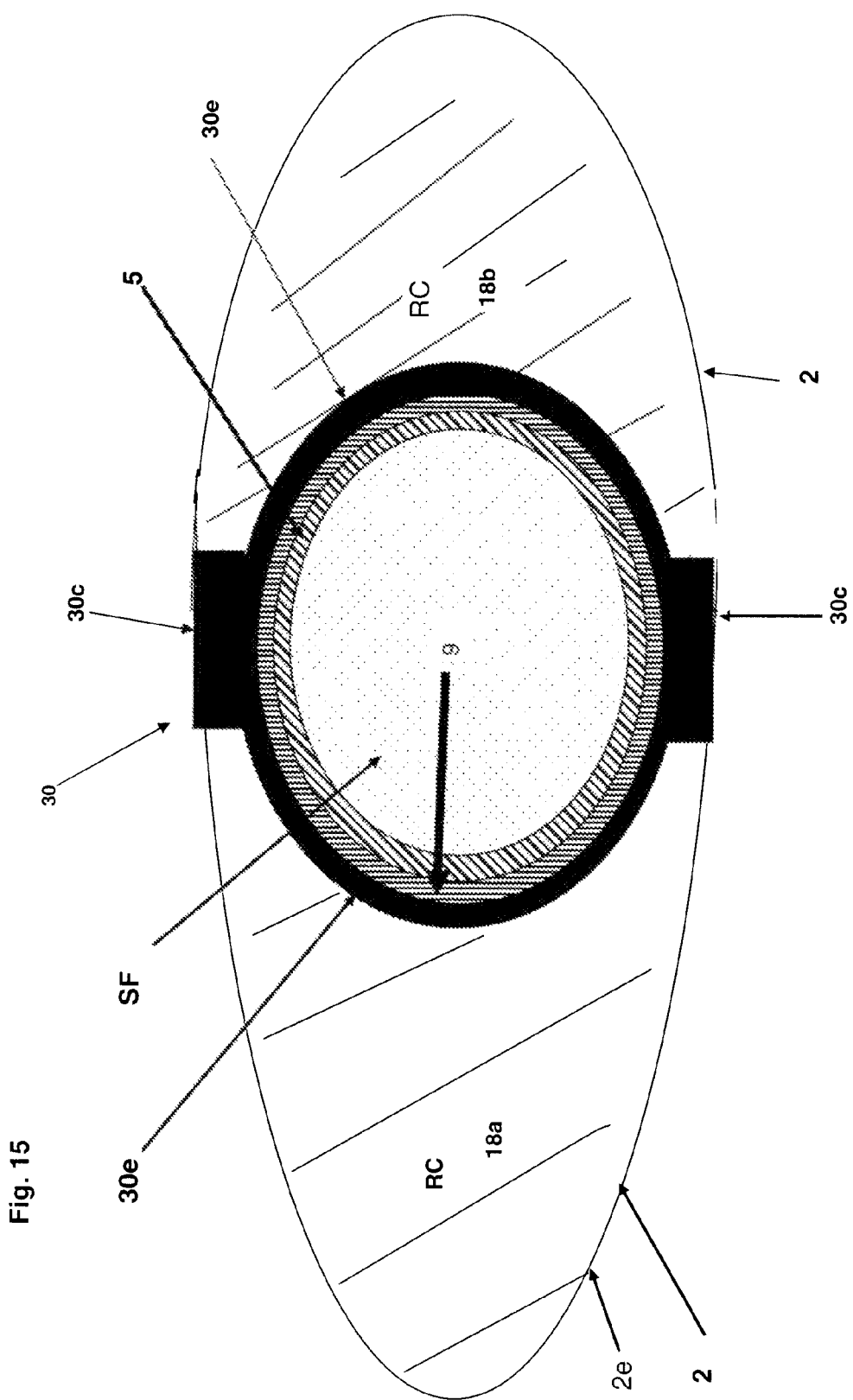
FIG. 15 is a cross section view of a reservoir with multiple reservoir chambers.
Figure 19:
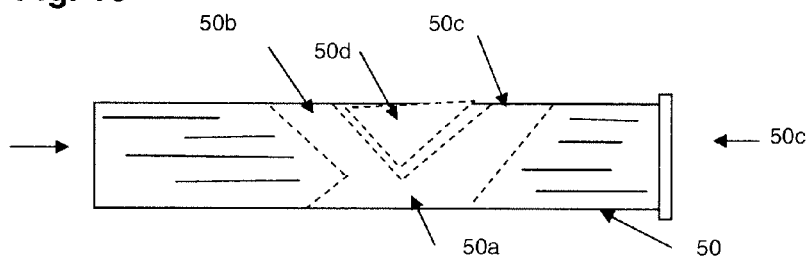
FIG. 19 is a side view of a fluid router actuator showing fluid paths.

As shown in FIG. 15, the activator tube 9 is movably mounted concentrically over the fluid supply tube 5 and is positioned between the fluid supply tube 5 and the reservoir 2 partition seal 30.

Operation of Alternate Embodiment 3 in the Closed Position

In the closed position, the partition seal metering ports 30d are aligned parallel to a corresponding fluid supply tube metering hole 5d. The activator tube 9 forms a barrier between the partition seal metering ports 30d and the fluid supply tube metering holes 5d and inhibits fluid communication between the reservoir 2 and the fluid supply tube 5. Supply fluid SF flows through the one-way entry flow valve 3a, through the supply tube 5, through the one-way exit flow valve 4a in the exit tubing adapter 4, to a fluid output device 23. The fluid output device 23 is generally a fluid-handling component such as a hose, tubing, or a bite-valve device.

In the closed position, the solution of supply fluid that enters the Inline Fluid Dispenser 1 is the same solution of supply fluid that exits the Inline Fluid Dispenser 1.

Operation of Alternate Embodiment 3 in the Activated Position

As noted above, in the closed position of the alternate embodiment, as shown in FIGS. 11A, 11B, 11C, and 11D supply fluid SF, such as water or other liquid or quasi-liquid solutions, is provided by a fluid source 10 attached to the entry-tubing adapter 3 when the user sucks on the fluid output device 23 or otherwise provides a negative pressure at the fluid output device 23.

To activate the Inline Fluid Dispenser 1, the user rotates the activator tube crown 11, which raises the activator tube distal end 9e, as shown in FIG. 11B, such that fluid communication is established between the partition seal metering ports 30d and respectively aligned fluid supply tube metering holes 5d. Rotation of the activator tube crown 11 can raise the activator tube 9 or rotate the activator tube without raising it. Importantly, the position or location of metering ports 30d in each reservoir chamber 18a, 18b corresponds to a position or location of a fluid supply tube metering hole 5d independently of their respective positions in other reservoir chambers, 18a, 18b. This allows each reservoir chamber 18a, 18b to establish fluid communication with the fluid supply tube 5 independently.

As shown in FIGS. 11A, 11B, 11C, and 11D when the activator tube 9 is moved up along the fluid supply tube 5, reservoir chamber 18a establishes fluid communication with the fluid supply tube central chamber 5e as the activator tube 9 slides past the aligned partition seal metering port 30d. Since the partition seal metering port 30d and supply tube metering holes 5d in reservoir chamber 18a (Position 1) are positioned closer to the entry-tubing adapter 3 than the partition seal metering port 30d and supply tube metering holes 5d in reservoir chamber 18b (Position 2), chamber 18a will establish fluid communication with the fluid supply tube central chamber 5e before chamber 18b.

This gives the Inline Fluid Dispenser 1 functionality such that when a reservoir 2 includes multiple chambers 18a, 18b, the reservoir chambers 18a, 18b establish fluid communication with the fluid supply tube 5 independently of each other. As the activator tube 9 is raised and uncovers an alignment of a partition seal metering port 30d with a supply tube metering hole 5d fluid communication is established.

For example, the partition seal metering port 30d at Position 1 can be uncovered allowing fluid communication between the reservoir at chamber 18a and the fluid supply tube 5, although no fluid communication is possible between the reservoir at chamber 18b and the fluid supply tube 5 because the partition seal metering port 30d at Position 2 is not uncovered.

This embodiment provides the user the ability to selectively combine reservoir contents suited to the user's activities. For example, a bike rider may need an electrolyte supplement and caffeine to be supplied simultaneously or military personnel may require an energy supplement and additional protein be supplied simultaneously to maintain their energy level and alertness.

Alternate Embodiment 4—Multiple Reservoir Chambers and Activator Tube Includes Metering Orfices In an alternate embodiment of the Inline Fluid Dispenser 1, as shown in FIGS. 11A, 11B, 11C, 11D, and 20 reservoir 2 further includes a plurality of chambers 18a, 18b, in combination with activator tube metering orifices 9b, and a partition seal 30. The partition seal 30 separates each of the reservoir chambers 18a, and 18b from each other. It is understood there can be an unrestricted number of combinations of reservoir chambers 18, activator tube metering orifices 9b, and corresponding partitions seals 30. The embodiment presently disclosed is merely exemplary.

The partition seal 30 includes a partition seal column shaped segment 30c connecting a partition seal first end 30a and a partition seal second end 30b together. The partition seal column shaped segment 30c includes metering ports 30d around a central partition seal chamber 30e.

A variety of partition seal metering port 30d positions or locations are employed which include a single metering port 30d at a single location, a plurality of metering ports 30d around the partition seal 30 which are all positioned the at the same distance between the partition seal first end 30a and a partition seal second end 30b, or a plurality of metering ports 30d around the partition seal 30 which are each positioned at a unique distance between the partition seal first end 30a and a partition seal second end 30b. Any desired combination of the preceding metering port 30d positions or locations can be applied as needed for the specific fluid flow and fluid mixing requirements.

The partition seal metering ports 30d allow fluid communication between the respective reservoir chamber 18, the fluid supply tube central chamber 9e, and activator tube metering orifices 9b. The metering ports 30d can be a variety of shapes, such as oval, triangular, round, or saw-toothed, wherein the shape of the metering ports 30d affects the fluid flow through the metering ports 30d as described further herein.

The activator tube 9 is movably mounted concentrically over the fluid supply tube 5 and is positioned between the fluid supply tube 5 and the reservoir 2 partition seal 30.

Operation of Alternate Embodiment 4 in the Closed Position

In the closed position, the partition seal metering ports 30d may or may not be aligned with the corresponding fluid supply tube metering hole 5d. The activator tube metering orifices 9b may be aligned with either the partition seal metering ports 30d or fluid supply tube metering hole 5d but not both. Alignment with both in the closed position would undesirably establish fluid communication between the reservoir 2 and the fluid supply tube 5. In the closed position the activator tube 9 forms a barrier between the partition seal metering ports 30d and the fluid supply tube metering holes 5d and prohibits fluid communication between the reservoir 2 and the fluid supply tube 5 central chamber 9e. Supply fluid SF flows through the one-way entry flow valve 3a, through the supply tube 5, through the one-way exit flow valve 4a in the exit tubing adapter 4, to a fluid output device 23. The fluid output device 23 is generally a fluid-handling component such as a hose, tubing, or a bite-valve device.

In the closed position, the solution of supply fluid that enters the Inline Fluid Dispenser is the same solution of supply fluid that exits the Inline Fluid Dispenser Operation of Alternate Embodiment 4 in the Activated Position As noted above, in the closed position of the alternate embodiment, as shown in FIGS. 11A, 11B, 11C, 11D, and 15, supply fluid SF, such as water or other liquid or quasi-liquid solutions, is provided by a fluid source 10 attached to the entry tubing adapter 3 when the user sucks/draws on the fluid output device 23 or otherwise provides a negative pressure at the fluid output device 23.

To activate the Inline Fluid Dispenser, the user rotates the activator tube crown 11, which rotates the activator tube 9 such that fluid communication is established between partition seal metering ports 30d positioned at a respective reservoir chamber 18a, 18b, respective aligned activator tube metering orifices 9b, and respective aligned fluid supply tube metering holes 5d thereby allowing the reservoir contents RC to flow from the respective reservoir chamber 18a, 18b to the fluid supply tube 5 central chamber 9e. Rotation of the activator tube crown 11 can raise the activator tube 9 or rotate the activator tube without raising it.

Importantly, the position or location of partition seal metering ports metering ports 30d in each reservoir chamber 18a, 18b corresponds to a position or location of activator tube metering orifices 9b and also corresponds to a position or location of fluid supply tube metering holes 5d independently of the position or location of the activator tube metering orifices 9b and fluid supply tube metering holes 5d of other reservoir chambers, 18a, 18b. This allows each reservoir chamber 18a, 18b to establish fluid communication with the fluid supply tube 5 independently of other reservoir chambers when there are a plurality of reservoir chambers 18a, 18b.

Figure 11D:
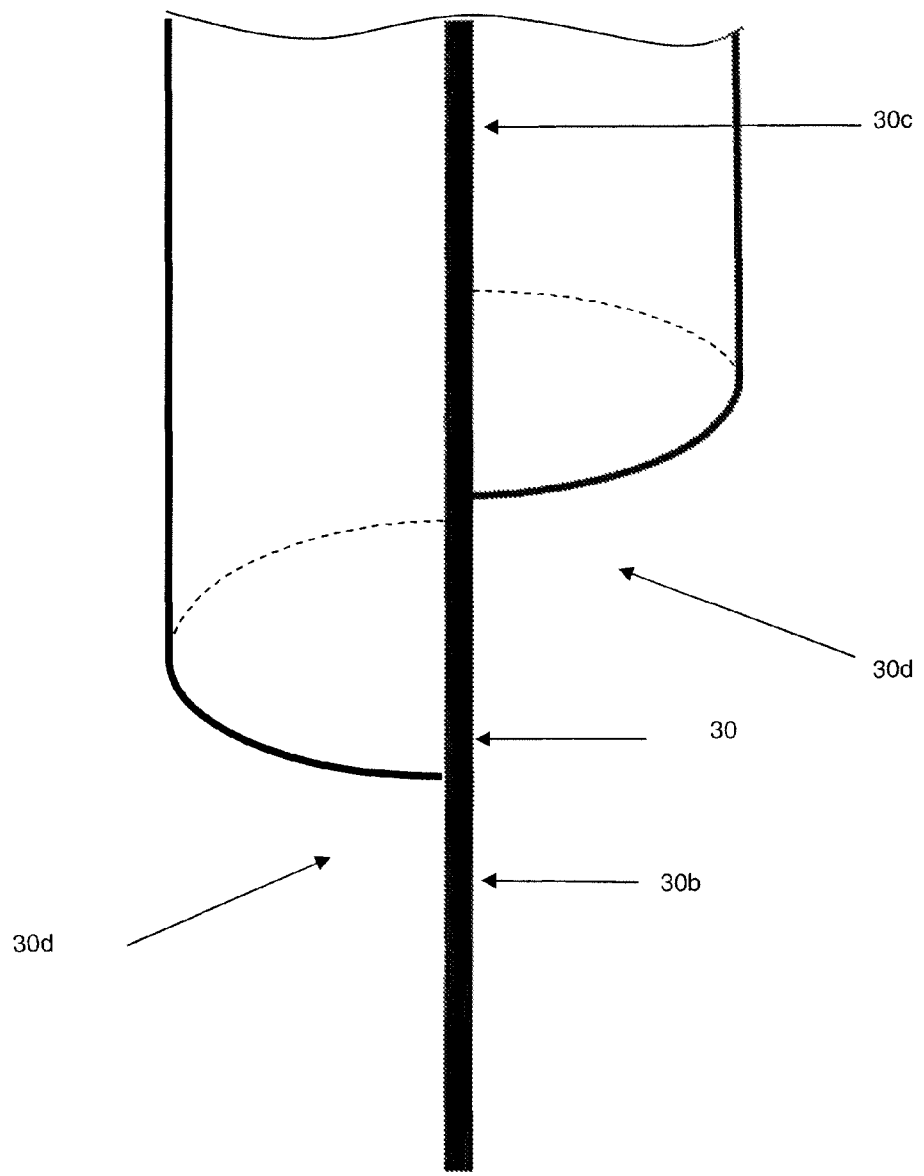
FIG. 11D is a front view of the chamber partition seal.

As shown in FIGS. 11A, 11B, 11C, 11D, when the activator tube 9 is rotated, reservoir chamber 2 establishes fluid communication with the fluid supply tube central chamber 5e when the respective activator tube 9 metering orifice 9b aligns with the respective partition seal metering port 30d and the respective fluid supply metering hole 5d. Each combination of partition seal metering port 30d, activator tube 9 metering orifice 9b, and fluid supply tube central chamber Se which corresponds to a reservoir chamber 18a, 18b is independently aligned during the rotation of the activator tube 9 such that when reservoir 2 includes multiple reservoir chambers 18a, 18b, each of the chambers establishes fluid communication with the fluid supply tube 5 independently of each other. The sequence of which particular reservoir chamber is in fluid communication with the fluid supply tube 5 is determined by the applicable patterns of alignment for the partition seal metering port 30d, activator tube 9 metering orifice 9b and fluid supply metering hole 5d. In one pattern of alignment of multiple reservoir chambers 18a, 18b, for example, all the reservoir contents RC have simultaneous fluid communication with the fluid supply tube 5. In this alignment pattern, as shown in FIG. 11C, the Inline Fluid Dispenser 1 would be fully activated and the unique combination of the multiple reservoir contents IRC can provide the desired beverage/ mixture output. The appropriate alignment patterns can be established to allow for a specific selection of which particular reservoir chambers are concurrently aligned with each other and contemporaneously aligned with the fluid supply tube 5.

This embodiment includes the advantages disclosed for other embodiments as applicable.

Alternate Embodiment 5—Adjustable Fluid Router

In an alternate embodiment of the activation system 6 of the Inline Fluid Dispenser 1, as shown in FIGS. 16, 17, and 19-23 the entry-tubing adapter 3 further includes an entry-tubing adapter top end 3d, a entry-tubing adapter bottom end 3b, and an activation system 6 employing an adjustable fluid router 50 having an adjustable fluid router activator 50e.

Figure 27:
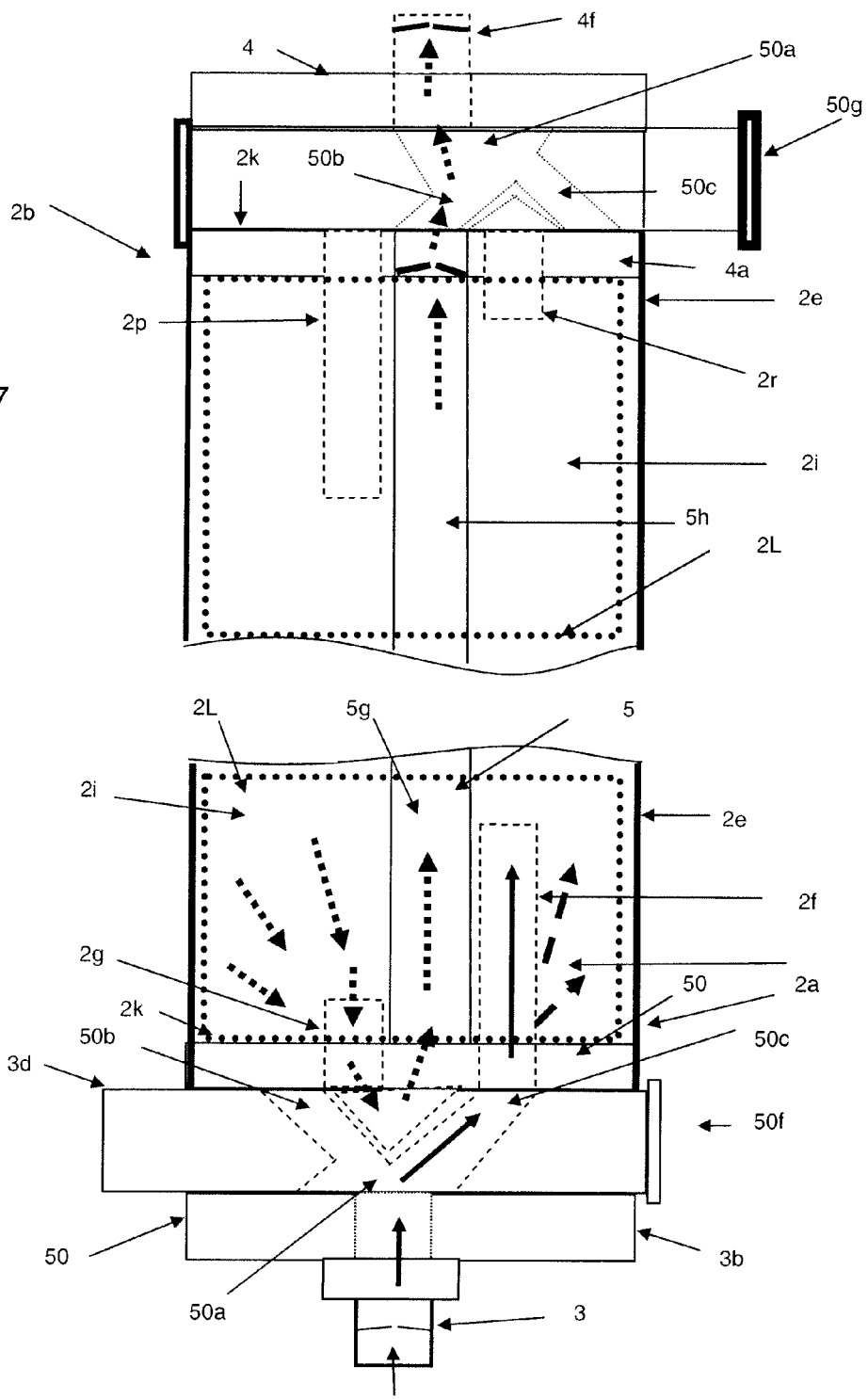
FIG. 27 is an Inline Fluid Dispenser of the present invention including fluid routers mounted in the entry-tubing adapter and the exit-tubing adapter.

In the activation system 6 of this embodiment, the components and operation of the adjustable fluid router 50 replaces the activator tube 9, activator tube crown 11, activator tube threads 12, activator tube stops 13 of the preferred embodiment and the applicable operation that uses those components. The activation system 6 of this embodiment further includes a fluid supply tube entry column 5g concentrically slidably surrounded by a fluid supply tube exit column 5h. The fluid supply tube entry column 5g and fluid supply tube exit column 5h are separable, such as during filling or refilling of the reservoir 2, as shown in FIG. 17 and FIG. 27

The adjustable fluid router 50 is positioned within the entry-tubing adapter 3 between the entry-tubing adapter top end 3d and the entry-tubing adapter bottom end 3b to selectively direct the flow of supply fluid SF into the reservoir 2 and/or fluid supply tube 5. Further, the entry-tubing adapter 3 includes a first internal diffuser inlet 2f and a first internal diffuser outlet 2g to respectively direct fluid flow from the adjustable fluid router 50 into and out of the reservoir 2. The first internal diffuser inlet 2f and first internal diffuser outlet 2g are protrusions that extend from the entry-tubing adapter top end 3d into the reservoir chamber 18 and may include diffuser pores (not shown) to enhance fluid flow and fluid communication. The first internal diffuser inlet 2f and first internal diffuser outlet 2g may be shaped, as needed, to affect fluid flow, for example they may be columns, as shown in FIGS. 16 and 17, or they may be U-shaped to direct fluid flow towards the entry-tubing adapter top end 3d.

Operation of Alternate Embodiment 5 in the Pass-Thru/Closed Position

Figure 21:
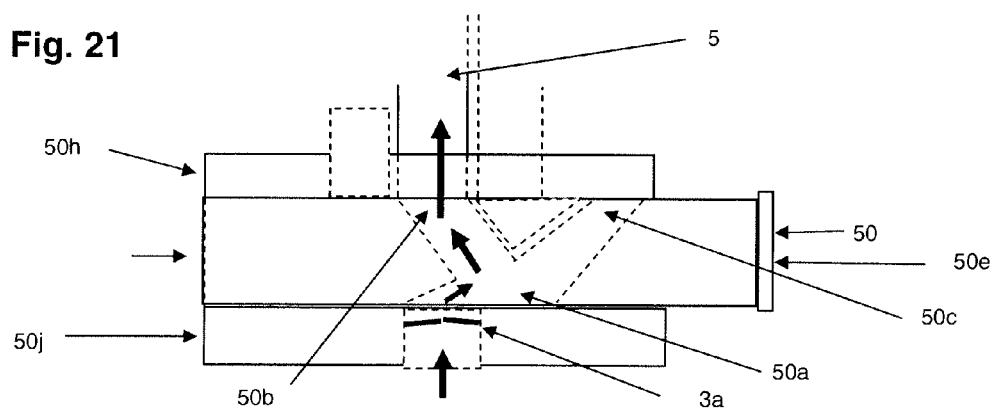
FIG. 21 is a side view of a fluid router actuator showing fluid paths.
Figure 22:
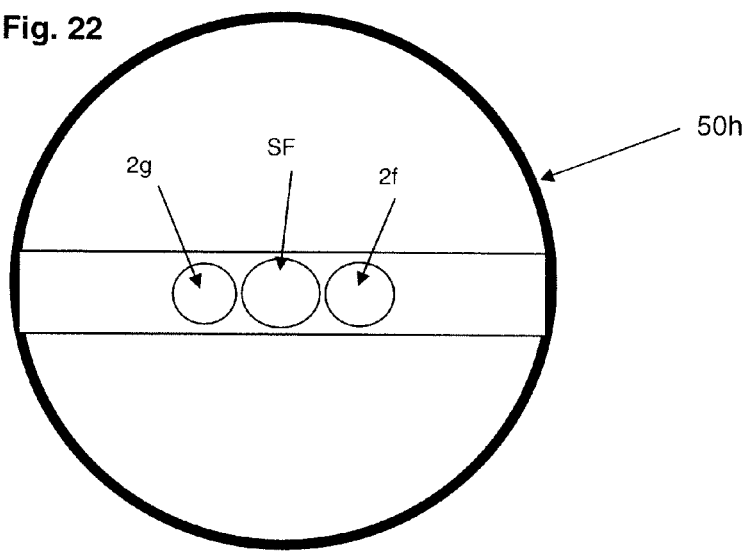
FIG. 22 is a top view of a fluid router.
Figure 23:
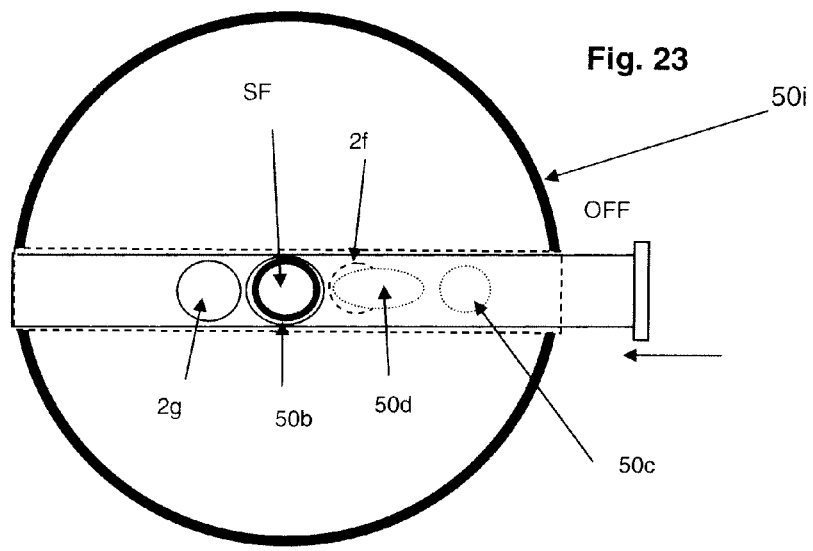
FIG. 23 is a cross section view a fluid router showing orifice alignments.
Figure 24:
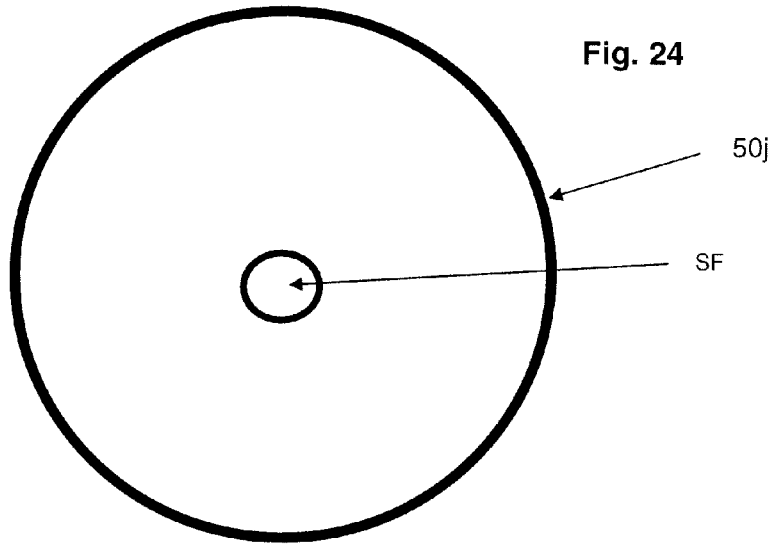
FIG. 24 is a bottom view of a fluid router.

The Inline Fluid Dispenser is in a deactivated position when the adjustable fluid router activator 50e is in the Pass-thru/Closed Position as shown in FIGS. 16 and 21. Supply fluid SF flows from the fluid source to the entry tubing adapter's one-way entry flow valve 3a and then to the entry-tubing adapter's adjustable fluid router center port 50a which directs the supply fluid SF to entry-tubing adapter's adjustable fluid router tube port 50b and on to the fluid supply tube 5. From there, supply fluid SF flows through the one-way exit flow valve 4a in the exit tubing adapter 4 and on to a fluid output device 23. The fluid output device 23 is generally a fluid-handling component such as a hose, tubing, or a bite-valve device.

Operation of Alternate Embodiment 5 in the Diverted/Activated Position

Figure 20:
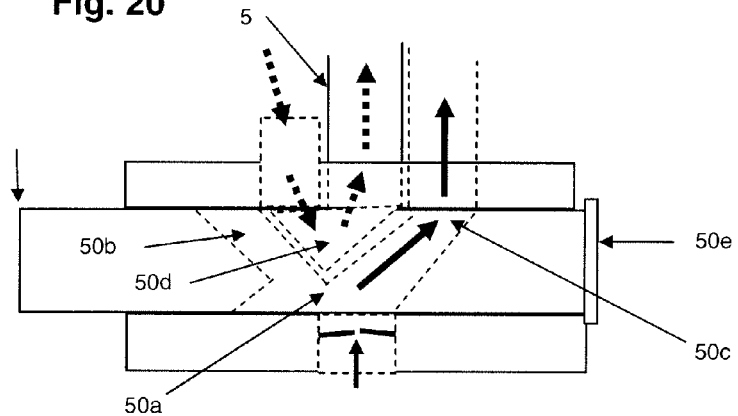
FIG. 20 is a side view of a fluid router actuator showing an active position.

With the adjustable fluid router activator 50e in a Diverted/Activated Position, as shown in FIGS. 17 and 20 the flow path of the supply fluid SF is determined by the specific adjustable fluid router supply port(s) 50c that are aligned with the one-way entry flow valve 3a. The entry tubing adapter 3 may contain adjustable fluid router tube port 50b as well as multiple adjustable fluid router supply ports 50c and thereby provide multiple selectable paths for fluid to flow from the one-way entry flow valve 3a to the fluid supply tube 5 and/or the reservoir 2 as desired.

The Diverted/Activated Position is activated moving the adjustable fluid router 50 to the Diverted/Activated Position, as shown in FIG. 20. In the Diverted/Activated Position the supply fluid SF flows from the fluid source to the entry tubing adapter's one-way entry flow valve 3a and then to the entry-tubing adapter's adjustable fluid router center port 50a which directs the supply fluid SF to entry-tubing adapter's adjustable fluid router supply port 50c and on to reservoir 2. At the reservoir 2 supply fluid SF enters the first internal diffuser inlet 2f, mixes with the contents of the reservoir 2 to form a mixed fluid MF, and exits at the first internal diffuser outlet 2g. At the first internal diffuser outlet 2g the mixed fluid MF reenters the entry-tubing adapter's adjustable fluid router at port 50d and is directed into the fluid supply tube 5. From there, mixed fluid MF flows through the one-way exit flow valve 4a in the exit tubing adapter 4 and on to a fluid output device 23. The fluid output device 23 is generally a fluid-handling component such as a hose, tubing, or a bite-valve device.

As the initial contents of the reservoir 2 are depleted, the mixed fluid MF becomes predominately supply fluid SF such that when the initial contents of the reservoir 2 are completely depleted, supply fluid SF flows through the Inline Fluid Dispenser 1 in both the Pass-Thru/Closed Position and in the Diverted/Activated Position, thereby providing a continual stream of supply fluid SF and/or mixed Fluid when the user sucks on the fluid output device 23 or otherwise provides a negative pressure at the fluid output device 23.

This embodiment provides users an easy to activate mechanism, in addition to the advantages disclosed for other embodiments as applicable.

Reservoir Variations

As presented in the preferred embodiment, see FIG. 1, reservoir 2 generally includes at least 1 (one) reservoir chamber 18, which is configured to contain fluids, liquids, gels, pastes, pellets, powders, or other substances. The reservoir 2 includes a bottom end 2a and a top end 2b. The reservoir 2 is positioned to surround the activator tube 9. Embodiments for the reservoir include reservoirs that can be filled, refilled, reservoirs that employ pre-filled disposable solution cartridges, single use reservoirs, and solution cartridges that can be stacked together in reservoir combinations so that multiple reservoirs can be used simultaneously as needed. The solution cartridges are configured to contain fluids, liquids, gels, pastes, pellets, powders, gases, or other substances having material form.

Alternate Embodiment 6—Refillable Reservoir

The Inline Fluid Dispenser includes a configuration that uses refillable reservoirs 2c. As shown in FIG. 18A, the reservoir 2 includes a bottom end 2a that abuts the entry-tubing adapter 3, a top end 2b alignable with the exit-tubing adapter 4, a reservoir shell body 2e, extending from the entry-tubing adapter 3. The refillable reservoir 2c further includes a detachable top 2d to be positioned at the reservoir top end 2b. The reservoir detachable top 2d includes reservoir top threads 2v position within an inner cavity of the detachable reservoir top 2d.

The reservoir shell body 2e includes reservoir shell body threads 2w positioned around the reservoir shell body 2e opposite the bottom end 2a (which abuts the entry-tubing adapter 3). As shown by way of example in FIGS. 16-17, and 18A the reservoir shell body threads 2w complimentarily match the detachable reservoir top threads 2v so that when the when the detachable reservoir top 2d is screwed down onto the reservoir shell body 2e, an air tight or liquid tight seal is formed. Optionally, a seal (not shown) may be positioned between the reservoir shell body 2e and the detachable reservoir top 2d to prevent leakage of air or fluid.

Additional means for removably attaching the detachable reservoir top 2d to the reservoir shell body 2e are anticipated by the present invention (although not shown) which include the use of temporary fasteners, clamps, clasps, and bands (flexible and/or rigid).

Operation of Alternate Embodiment 6—Refillable Reservoir

To fill (or refill) the Inline Fluid Dispenser 1, as shown in FIG. 18A the detachable reservoir top 2d is separated from the reservoir shell body 2e, such as by unscrewing, and the user pours the desired amount of the desired contents into the reservoir 2. Where the activator tube 9 is removably mounted concentrically over the fluid supply tube 5, when the reservoir top 2d is separated from the reservoir shell body 2e the activator tube 9 remains connected to the exit tubing-adapter 4 while the fluid supply tube 5 and reservoir 2 remain connected to the entry tubing adapter 3. The detachable reservoir top 2d is then snugly screwed or reattached onto the reservoir shell body 2e such that a tight enough seal is formed to prevent air or liquid leakage. With the Inline Fluid Dispenser 1 filled (or refilled) fluid flow selection is made by use of the adjustable fluid router 50 as previously presented or via other activation methods presented herein.

By way of the detachable reservoir top 2d users can refill the reservoir 2c as frequently as needed without disconnecting the entry-tubing adapter 3 from the fluid supply tube first end 5a or the exit tubing-adapter 4 from the fluid output device 23.

This embodiment includes the advantages disclosed for other embodiments as applicable.

Alternate Embodiment 7—Solution Cartridge

Figure 25:
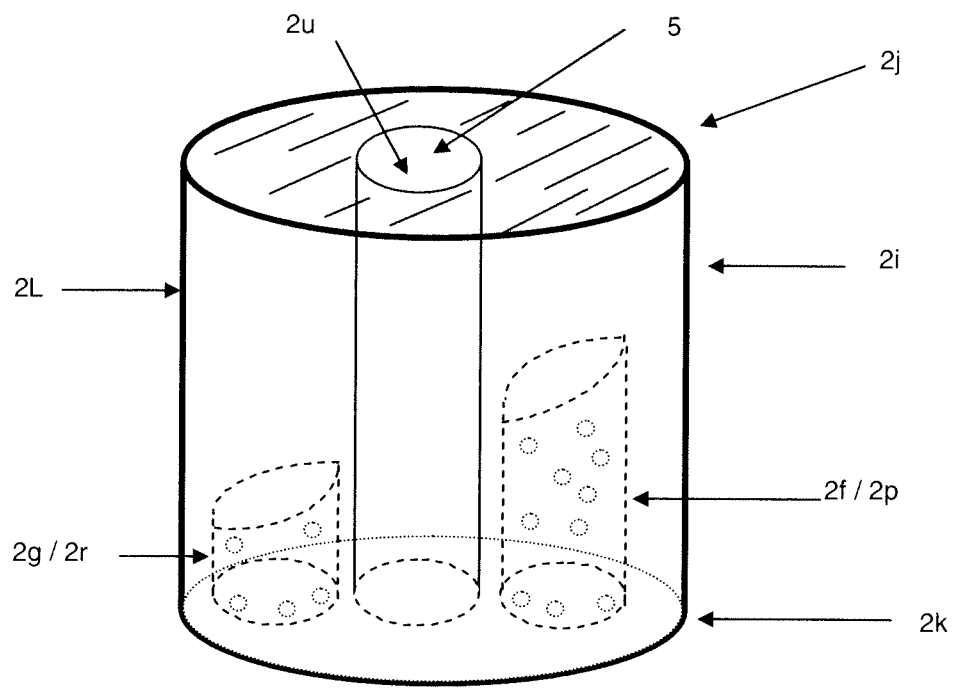
FIG. 25 is a cartridge.
Figure 26:
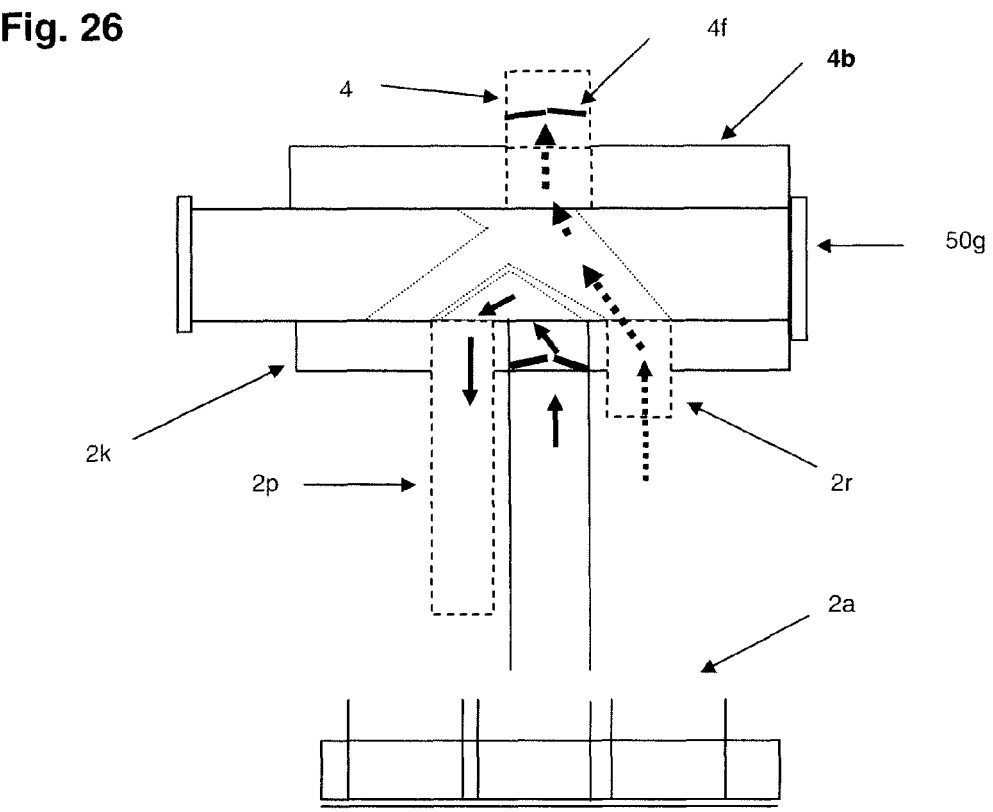
FIG. 26 is a front view of a fluid router mounted in an exit-tubing adapter.

The Inline Fluid Dispenser includes a configuration that uses pre-filled solution cartridges 2i, as shown in FIGS. 25 and 27. The reservoir 2 generally includes a bottom end 2a that abuts the entry-tubing adapter 3 and a top end 2b that abut the exit-tubing adapter 4 and the reservoir shell body 2e, as previously presented. The entry-tubing adapter 3 further includes a first internal diffuser inlet 2f and a first internal diffuser outlet 2g to direct fluid flow into and out of the reservoir 2. The first internal diffuser inlet 2f and first internal diffuser outlet 2g are protrusions that extend from the entry-tubing adapter top end 3d into the reservoir 2 and may include diffuser pores (not shown) to enhance fluid flow and fluid communication. The first internal diffuser inlet 2f and first internal diffuser outlet 2g may be shaped, as needed, to affect fluid flow, for example they may be columns.

As shown in FIGS. 16 and 17, the refillable reservoir 2c may include a detachable top 2d positioned at the reservoir top end 2b and a seal (not shown) positioned between the reservoir shell body 2e and the detachable reservoir top 2d to prevent leakage of air or fluid.

As shown in FIG. 25, the solution cartridges 2i include a cartridge top end 2j, a cartridge bottom end 2k composed of a penetrable material, and a cartridge shell 2L forming the outer circumference of the disposable cartridge which can be comprised of a flexible material, such as plastic or thin foil, which allows the volume of the cartridge to increase or decrease. The solution cartridge 2i includes a mounting section 2u which surrounds the activator tube 9 or the fluid supply tube 5, as applicable, depending upon the activation system 6 used.

The term solution cartridge, as used herein, includes solution cartridges that can be refilled after use and then inserted into the Inline Fluid Dispenser 1, solution cartridges that are only partially filled and then inserted into the Inline Fluid Dispenser 1, solution cartridges that are only partially used and then later re-inserted into the Inline Fluid Dispenser 1, solution cartridges that can be used once and disposed of or discarded, and any combination thereof.

Operation of Alternate Embodiment 7—Solution Cartridge

To fill (or refill) the Inline Fluid Dispenser 1 the user inserts the desired solution cartridge 2i into the reservoir 2 with the penetrable solution cartridge bottom end 2k positioned near the first internal diffuser inlet 2f and first internal diffuser outlet 2g of the entry-tubing adapter top end 3d. The user presses the solution cartridge 2i down onto the first internal diffuser inlet 2f and first internal diffuser outlet 2g so that they pierce the penetrable solution cartridge bottom end 2k and extend into the interior of the solution cartridge shell 2L.

The detachable reservoir top 2d is the snugly screwed or reattached onto the reservoir shell body 2e such that a tight enough seal is formed to prevent air or liquid leakage. With the Inline Fluid Dispenser 1 filled (or refilled) fluid flow selection is made by use of the adjustable fluid router 50 as previously presented.

By way of the detachable reservoir top 2d and disposable cartridge 2i users can refill the reservoir 2c as frequently as needed without disconnecting the entry-tubing adapter 3 from the fluid supply tube first end 5a or the exit tubing-adapter 4 from the fluid output device 23.

The solution cartridges allow users to rapidly change or refill the Inline Fluid Dispenser 1 with cartridges containing materials or solutions which are more suitable for the user's conditions (such as electrolytes). Further, in hostile environments such as dust storms and nuclear, biological, and chemically sensitive environments the sealed cartridges are less like to become contaminated. Additionally, the Inline Fluid Dispenser 1 cartridges can contain various medicinal substances such as agents to treat or prevent infection or contamination from environmental hazards.

Alternate Embodiment 8—Wherein Solution Cartridge Forms Reservoir

The Inline Fluid Dispenser 1 includes a configuration that uses solution cartridges 2i wherein it is the solution cartridge that forms the reservoir structure. In this embodiment the Inline Fluid Dispenser 1 generally includes the entry-tubing adapter 3 and the exit-tubing adapter 4 as previously presented which are removably attachable to a solution cartridge 2i. The entry-tubing adapter 3 further includes a first internal diffuser inlet 2f and a first internal diffuser outlet 2g to direct fluid flow into and out of the solution cartridge 2i. The first internal diffuser inlet 2f and first internal diffuser outlet 2g are protrusions that extend from the entry-tubing adapter top end 3d into the solution cartridge 2i and may include diffuser pores (not shown) to enhance fluid flow and fluid communication. The first internal diffuser inlet 2f and first internal diffuser outlet 2g may be shaped, as needed, to affect fluid flow, for example they may be columns, as shown in FIGS. 16 and 17.

The solution cartridges 2i include a cartridge top end 2j, a cartridge bottom end 2k composed of a penetrable material, and a cartridge shell 2L forming the outer circumference of the disposable cartridge which can be comprised of a flexible material, such as plastic or thin foil, which allows the volume of the cartridge to increase or decrease.

The term disposable solution cartridge, as used herein, includes solution cartridges that can be refilled after use and then inserted into the Inline Fluid Dispenser 1, solution cartridges that are only partially filled and then inserted into the Inline Fluid Dispenser 1, solution cartridges that are only partially used and then later re-inserted into the Inline Fluid Dispenser 1, solution cartridges that can be used once and discarded, and any combination thereof.

Operation of Alternate Embodiment 8—Solution Cartridge

To fill (or refill) the Inline Fluid Dispenser 1 the user positions the penetrable solution cartridge bottom end 2k near the first internal diffuser inlet 2f and first internal diffuser outlet 2g of the entry-tubing adapter top end 3d. The user presses the solution cartridge 2i down onto the first internal diffuser inlet 2f and first internal diffuser outlet 2g so that they pierce the penetrable cartridge bottom end 2k and extend into the interior of the solution cartridge shell 2L.

The exit-tubing adapter 4 is then snugly screwed or pressed onto the cartridge top end 2j, such that a tight enough seal is formed at the first internal diffuser inlet 2f and first internal diffuser outlet 2g to prevent air or liquid leakage. With the Inline Fluid Dispenser 1 filled (or refilled) fluid flow selection is made by use of the adjustable fluid router 50 as previously presented.

By way of the solution cartridge 2i users can refill the reservoir 2c as frequently as needed without disconnecting the entry-tubing adapter 3 from the fluid supply tube first end 5a or the exit tubing-adapter 4 from the fluid output device 23.

This embodiment includes the advantages disclosed for other embodiments as applicable.

Alternate Embodiment 9—Multiple Solution Cartridges

The Inline Fluid Dispenser includes a configuration that uses multiple solution cartridges 2n, as shown in FIG. 27. The reservoir 2 generally includes a bottom end 2a that abuts the entry-tubing adapter 3 and a reservoir top end 2b that abuts the exit-tubing adapter 4, and the reservoir shell body 2e, as previously presented.

The entry-tubing adapter 3 further includes an entry-tubing adapter top end 3d, a entry-tubing adapter bottom end 3b, and an adjustable fluid router 50f. The entry-tubing adapter 3 further includes a first internal diffuser inlet 2f and a first internal diffuser outlet 2g to direct fluid flow from the adjustable fluid router 50 into and out of the reservoir 2. The first internal diffuser inlet 2f and first internal diffuser outlet 2g are protrusions that extend from the entry-tubing adapter top end 3d into the reservoir chamber 18 and may include diffuser pores (not shown) to enhance fluid flow and fluid communication.

The exit-tubing adapter 4 further includes an exit-tubing adapter top end 4a, an exit-tubing adapter bottom end 4b, and an exit-tubing adapter adjustable fluid router 50g movably positioned between the exit-tubing adapter top end 4a and the exit-tubing adapter bottom end 4b to selectively direct the flow of supply fluid SF into the reservoir top end 2b and/or fluid supply tube 5. The exit-tubing adapter further includes a second internal diffuser inlet 2p and second internal diffuser outlet 2r which are protrusions that extend from the exit-tubing adapter bottom end 4b for insertion into the solution cartridge 2i and may include diffuser pores (not shown) to enhance fluid flow and fluid communication.

The reservoir 2 accepts the first internal diffuser inlet 2f, the second internal diffuser inlet 2p, the first internal diffuser outlet 2g, and the second internal diffuser outlet 2r to direct fluid flow into and out of the reservoir 2.

The first and second internal diffuser inlet and the first and second internal diffuser outlet may be shaped, as needed, to affect fluid flow, for example they may be columns.

As shown in FIG. 27, the Inline Fluid Dispenser further includes a supplemental check valve 4f positioned in the fluid supply tube 5 downstream from the exit-tubing adapter 4. The supplemental check valve 4f prevents fluid that is flowing through the exit-tubing adapter's adjustable fluid router 50g from flowing down the fluid supply tube 5 towards the entry-tubing adapter 3.

The reservoir 2c, as shown in the embodiment of FIG. 18A, further includes a detachable top 2d positioned at the reservoir top end 2b and a seal (not shown) is positioned between the reservoir shell body 2e and the detachable reservoir top 2d to prevent leakage of air or fluid.

The solution cartridges 2n, 2i include a cartridge top end 2j, a cartridge bottom end 2k composed of a penetrable material, and a cartridge shell 2L forming the outer circumference of the disposable cartridge 2i which can be comprised of a flexible material, such as plastic or thin foil, which allows the volume of the cartridge to increase or decrease.

The term solution cartridge, as used herein, includes solution cartridges that can be refilled after use and then inserted into the Inline Fluid Dispenser 1, solution cartridges that are only partially filled and then inserted into the Inline Fluid Dispenser 1, solution cartridges that are only partially used and then later re-inserted into the Inline Fluid Dispenser 1, solution cartridges that can be used once and disposed of or discarded, and any combination thereof.

Operation of Alternate Embodiment 9—Multiple Solution Cartridges

To fill (or refill) the Inline Fluid Dispenser 1 with multiple solution cartridges, as shown in FIG. 27, the user inserts a first solution cartridge 2n, 2i into the reservoir 2 with the penetrable solution cartridge bottom end 2k positioned near the first internal diffuser inlet 2f and the first internal diffuser outlet 2g of the entry-tubing adapter top end 3d. Next, the user inserts a second solution cartridge 2i into the reservoir 2 with the penetrable solution cartridge bottom end 2k positioned near the second internal diffuser inlet 2p and the second internal diffuser outlet 2r of the exit-tubing adapter bottom end 4b such that the cartridge top end 2j of both solution cartridges abut each other. The user then presses the solution cartridges 2i onto the appropriate internal diffuser inlets and the internal diffuser outlets so that they pierce the applicable penetrable solution cartridge bottom ends 2k and extend into the interior of the appropriate solution cartridge shell 2L.

The detachable reservoir top 2d is then snugly screwed or reattached onto the reservoir shell body 2e such that a tight enough seal is formed to prevent air or liquid leakage. With the Inline Fluid Dispenser 1 filled (or refilled) fluid flow selection is made by use of the adjustable fluid router 50 as previously presented.

By way of the detachable reservoir top 2d and the disposable cartridges 2i users can refill the reservoir 2c as frequently as needed without disconnecting the entry-tubing adapter 3 from the fluid supply tube first end 5a or the exit tubing-adapter 4 from the fluid output device 23.

During use of the multiple solution cartridge configuration with two cartridges attached the user can selectively activate both solution cartridges, a single solution cartridge, or neither cartridge. With a single solution cartridge activated or both solution cartridges activated, the applicable adjustable fluid router 50 is placed in the diverted/Activated position and operates to control supply fluid SF flow through the solution cartridge/reservoir and fluid supply tube 5, as previously described.

The supplemental check valve 4f prevents fluid that is flowing through the exit-tubing adapter's adjustable fluid router 50g from flowing down the fluid supply tube 5 towards the entry-tubing adapter 3 and its adjustable fluid router 50f.

Users can apply suction to the output device 23 and draw a single fluid solution by activating a single solution cartridge 2i or users can draw both solutions simultaneously by activating both solution cartridges 2i at the same time.

As previously disclosed, when the solution cartridge 2i is activated (placed in the diverted/Activated position) supply fluid SF flows from the fluid source to the entry tubing adapter's one-way entry flow valve 3a and then to the entry-tubing adapter's adjustable fluid router center port 50a which directs the supply fluid SF to entry-tubing adapter's adjustable fluid router supply port 50c and on to reservoir 2. At the reservoir 2 supply fluid SF enters the first internal diffuser inlet 2f, mixes with the contents of the reservoir 2 to form a mixed fluid MF, and exits at the first internal diffuser outlet 2g. At the first internal diffuser outlet 2g the mixed fluid MF reenters the entry-tubing adapter's adjustable fluid router at port 50d and is directed into the fluid supply tube 5.

In contrast to the previous embodiments, rather than having the supply fluid or mixed fluid SF/MF flow through the one-way exit flow valve 4a in the exit tubing adapter 4 and on to a fluid output device 23, the multiple solution cartridge 2i configuration provides a path for an additional and independent fluid solution to be introduced into the fluid supply tube 5 from the additional solution cartridge 2i.

This embodiment includes the advantages disclosed for other embodiments as applicable.

Alternate Embodiment 10—Wherein Multiple Solution Cartridges Forms Reservoir

The Inline Fluid Dispenser includes a configuration that uses multiple solution cartridges 2i wherein the solution cartridges form the reservoir structure. In this embodiment the Inline Fluid Dispenser generally includes the entry-tubing adapter 3 and the exit-tubing adapter 4 as previously presented which are removably attachable to a solution cartridge. The entry-tubing adapter 3 further includes an entry-tubing adapter top end 3d, a entry-tubing adapter bottom end 3b, and an adjustable fluid router 50g. The exit-tubing adapter 4 further includes an exit-tubing adapter top end 4a, an exit-tubing adapter bottom end 4b, and an adjustable fluid router 50f.

The entry-tubing adapter 3 further includes a first internal diffuser inlet 2f and a first internal diffuser outlet 2g to direct fluid flow into and out of the solution cartridge 2i. The first internal diffuser inlet 2f and first internal diffuser outlet 2g are protrusions that extend from the entry-tubing adapter top end 3d for insertion into the solution cartridge 2i and may include diffuser pores (not shown) to enhance fluid flow and fluid communication. The second internal diffuser inlet 2p and second internal diffuser outlet 2r are protrusions that extend from the exit-tubing adapter bottom end 4b for insertion into the solution cartridge 2i and may include diffuser pores (not shown) to enhance fluid flow and fluid communication.

The first and second internal diffuser inlet and the first and second internal diffuser outlet may be shaped, as needed, to affect fluid flow, for example they may be columns, as shown in FIGS. 16 and 17.

The solution cartridges 2i include a cartridge top end 2j, a cartridge bottom end 2k composed of a penetrable material, and a cartridge shell 2L forming the outer circumference of the disposable cartridge which can be comprised of a flexible material, such as plastic or thin foil, which allows the volume of the cartridge to increase or decrease.

The term disposable solution cartridge, as used herein, includes solution cartridges that can be refilled after use and then inserted into the Inline Fluid Dispenser 1, solution cartridges that are only partially filled and then inserted into the Inline Fluid Dispenser 1, solution cartridges that are only partially used and then later re-inserted into the Inline Fluid Dispenser 1, solution cartridges that can be used once and discarded, and any combination thereof.

Operation of Alternate Embodiment 10—Where in Multiple Solution Cartridges Forms Reservoir To fill (or refill) the Inline Fluid Dispenser 1 the user positions the penetrable disposable cartridge bottom end 2k near the first internal diffuser inlet 2f and first internal diffuser outlet 2g of the entry-tubing adapter top end 3d. The user presses the disposable cartridge 2i down onto the first internal diffuser inlet 2f and first internal diffuser outlet 2g so that they pierce the penetrable cartridge bottom end 2k and extend into the interior of the disposable cartridge shell 2L.

The exit-tubing adapter 4 is then snugly screwed or pressed onto the cartridge top end 2j, such that a tight enough seal is formed at the first internal diffuser inlet 2f and first internal diffuser outlet 2g to prevent air or liquid leakage. With the Inline Fluid Dispenser 1 filled (or refilled) fluid flow selection is made by use of the adjustable fluid router 50 as previously presented.

To fill (or refill) the Inline Fluid Dispenser 1 with multiple solution cartridges the user positions a first solution cartridge 2i penetrable solution cartridge bottom end 2k near the first internal diffuser inlet 2f and the first internal diffuser outlet 2g of the entry-tubing adapter top end 3d. Next, the user positions a second solution cartridge 2i with the penetrable solution cartridge bottom end 2k near the second internal diffuser inlet 2p and the second internal diffuser outlet 2r of the exit-tubing adapter bottom end 4b such that the cartridge top end 2j of both solution cartridges abut each other. The user then presses the solution cartridges 2i onto the appropriate internal diffuser inlets and the internal diffuser outlets so that they pierce the applicable penetrable solution cartridge bottom ends 2k and extend into the interior of the appropriate solution cartridge shell 2L.

The exit-tubing adapter 4 is then snugly screwed or pressed onto the cartridges such that a tight enough seal is formed at the first and second internal diffuser inlets and the first and second internal diffuser outlets to prevent air or liquid leakage. With the Inline Fluid Dispenser 1 filled (or refilled) fluid flow selection is made by use of the adjustable fluid routers 50 as previously presented.

By way of the solution cartridges 2i users can refill the Inline Fluid Dispenser as frequently as needed without disconnecting the entry-tubing adapter 3 from the fluid supply tube first end 5a or the exit tubing-adapter 4 from the fluid output device 23.

This embodiment includes the advantages disclosed for other embodiments as applicable.

Alternate Embodiment 11—Self Constricting Reservoir

Figure 5A:
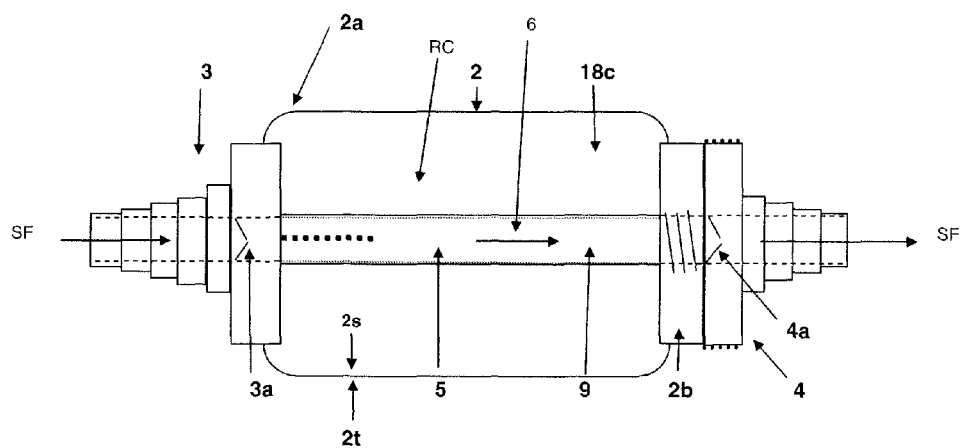
FIG. 5A is a drawing of an Inline Fluid Dispenser of the present invention with a self constricting reservoir in active position.

An alternate embodiment of the Inline Fluid Dispenser 1 includes a reservoir 2 having at least one reservoir chamber 18, which is configured to contain fluids, liquids, gels, pastes, pellets, powders, gases, or other substances having material form. The reservoir 2, as shown in FIG. 5A, includes a bottom end 2a that abuts the entry-tubing adapter 3 and a top end 2b that abut the exit-tubing adapter 4 and malleable reservoir shells including a primary reservoir shell 2s, and a secondary reservoir shell 2t, which together form the outer circumference of the reservoir 2. The reservoir 2 is positioned to surround the activator tube 9. The primary reservoir shell 2s is composed of a flexible material, such as plastic, thin foil, multi-layered films, or combinations thereof, wherein the flexible material allows the volume of the reservoir to increase or decrease and provides structural support to the reservoir 2. The secondary reservoir shell 2t is composed of a flexible, rigid or semi-rigid material that also provides structural support to the reservoir 2. Alternatively, the malleable reservoir shells can be made unitary to form a single reservoir shell composed of a rigid or semi-rigid material that provides structural support to the reservoir 2.

More specifically, the flexible material of reservoir shells is self-constricting such that in it's initial state the material is expanded and outwardly stretched, similar to a balloon after inflation, and the reservoir chamber 18c formed by the malleable reservoir shells contains the desired reservoir contents RC. The material of the malleable reservoir shells can retain shape memory such that when the reservoir shells self-constrict or collapse they tend to form a shape appropriate to the material memory.

The initial expansion of the material of the malleable reservoir shells creates self-constricting stresses that, without external force, tends to reduce the volume of the reservoir 2 formed by the reservoir shells. The material properties of the malleable reservoir shells well as the degree of outward expansion the malleable reservoir shells determines the amount of self-constricting stresses of the malleable reservoir shells. As the self-constricting malleable reservoir shells constrict (collapses) around the activator tube 9 the amount of self-constricting stresses tends to decrease. The material properties of the malleable reservoir shells also determines its malleability and its ability to deform in conjunction with the loss or addition of reservoir contents RC.

The constriction or collapse of the self-constricting malleable reservoir shells decreases the volume of the reservoir 2 however the self-constricting malleable reservoir shells is prohibited from constricting or collapsing until there is a fluid flow path for the reservoir contents RC to exit the reservoir 2 in conjunction with the decrease in reservoir volume RV.

The reservoir volume RV is determined by the shape taken by the enclosure formed within the malleable reservoir shells. As the interior walls formed by the malleable reservoir shells moves outwardly away from each other, the reservoir volume RV increases. As the interior walls of the malleable reservoir shells move inwardly towards each other, the reservoir volume RV decreases.

Operation of Alternate Embodiment 11—Self Constricting Reservoir

Generally, when the Inline Fluid Dispenser is in any of the previously disclosed activated positions substance is drawn from the reservoir 2, such as when the user sucks/draws on or otherwise provides a negative pressure to the Inline Fluid Dispenser 1, the interior walls of the malleable reservoir shells move inwardly towards each other as the substance is depleted. The volume of the reservoir 2 changes (reduces) as the reservoir contents RC flow into the fluid supply tube 5 thereby providing a volume-reducing reservoir 2.

Figure 5B:
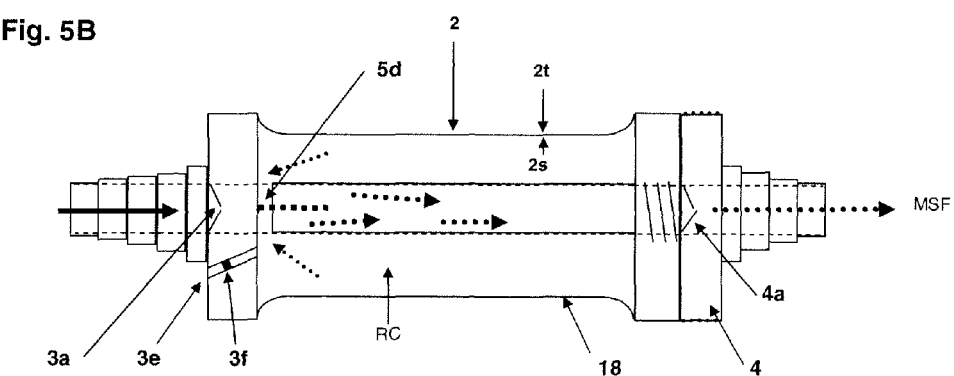
FIG. 5B is a drawing an Inline Fluid Dispenser of the present invention with a self constricting reservoir with reservoir contents partially depleted.

Further, when the Inline Fluid Dispenser 1 is in any of the activated positions of the activation system 6 as disclosed above, and as shown in FIG. 5B due to it's self-constricting or self-collapsing functionality, even without external force the malleable reservoir shells 2s and 2t force the reservoir contents RC into the fluid supply tube 5 when there is fluid communication between the reservoir 2 and the fluid supply tube 5. In any of the closed positions of activation system 6, as previously discussed, and as shown in FIG. 5A, there is no fluid communication between the reservoir 2 and the fluid supply tube 5 and therefore no constriction or collapse of the reservoir shell 2s and 2t occurs and hence there is no decrease in the reservoir volume RV.

The rate at which the reservoir shells force the reservoir contents RC into the fluid supply tube 5 is influenced by a variety of factors such as the area and shape of the ports, orifices, holes, valves, and reeds of the above embodiments of the Inline Fluid Dispenser. Additional factors affecting the rate at which the primary reservoir shell 2s forces the reservoir contents RC into the fluid supply tube 5 include the viscosity, consistency, temperature, and composition of the reservoir contents RC.

The secondary reservoir shell 2t surrounds the primary reservoir shell 2s, provides the outer structure to support the reservoir contents RC, and serves to aid in containing the reservoir contents RC within the reservoir 2. The secondary reservoir shell 2t can be comprised materials including, but not limited to flexible resins, heat sealed sheets, laminated sheets, and be formed as a single sheet or sheet layers.

The fluid flow through the supply tube 5 created by the user sucking/drawing on the fluid output device 23 (such as a bite valve) or otherwise provides a negative pressure at the fluid output device 23 is combined with the fluid flow created by the primary reservoir shell 2s forcing the reservoir contents RC into the fluid supply tube 5 and this mixed fluid MF flows through the one-way exit flow valve 4a in the exit tubing adapter 4, to a fluid output device 23. The fluid output device 23 is generally a fluid-handling component such as a hose, tubing, or a bite-valve device. Once the reservoir contents RC are depleted, the solution that flows to the fluid output device 23 and on to the user will only be the supply fluid SF, therefore the availability of supply fluid SF is not interrupted.

This embodiment includes the advantages disclosed for other embodiments as applicable.

Alternate Embodiment 12—Reservoir Including Fill-Tube and Balloon

Figure 4A:
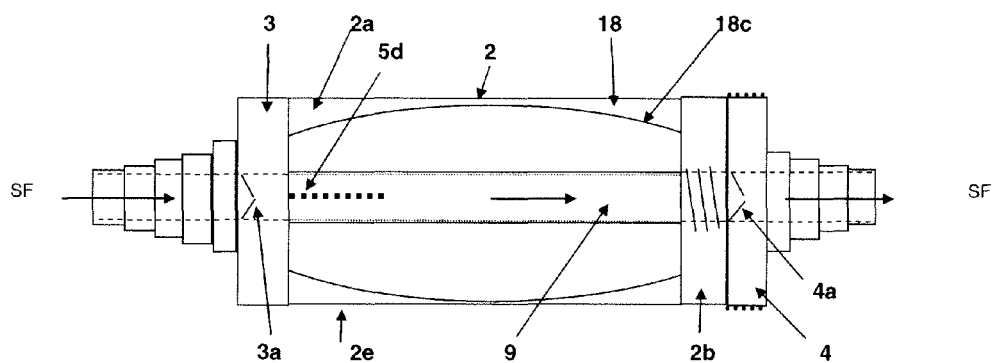
FIG. 4A is a drawing of the balloon type reservoir embodiment in the closed position.
Figure 4B:
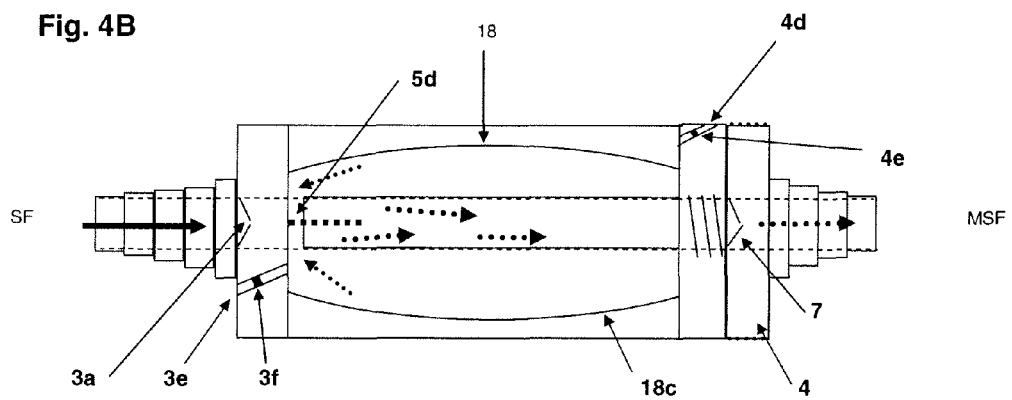
FIG. 4B is a drawing of the balloon type reservoir embodiment in the open position.

An alternate embodiment of the Inline Fluid Dispenser 1 includes a reservoir 2 having at least one reservoir chamber 18, as shown in FIG. 4A and FIG. 4B which is configured to contain at least one reservoir balloon 18c suited to contain fluids, liquids, gels, pastes, pellets, powders, gases, or other substances having material form. The reservoir 2 includes a bottom end 2a that abuts the entry-tubing adapter 3 and a top end 2b that abuts the exit-tubing adapter 4 and a reservoir shell body 2e which forms the outer circumference of the reservoir 2. The reservoir 2 is positioned to surround the activator tube 9. The reservoir shell body 2e is composed of a flexible material, such as plastic, thin foil, multi-layered films, or combinations thereof, wherein the flexible material allows the volume of the reservoir to increase or decrease.

The reservoir balloon 18c is composed of an expandable material such as food grade latex material and expands as the reservoir 2 is filled. Additionally, the reservoir balloon 18c may be composed of material developed to dissolve at an appropriate time such as after the balloon has been filled to the limits of the volume of the reservoir chamber 18. The reservoir balloon 18c is positioned within the reservoir chamber 18 adjacent the entry-tubing adapter 3.

The entry-tubing adapter 3 further includes a fill tube opening 3e and a fill seal 3f positioned on the entry-tubing adapter 3 to allow the reservoir balloon 18c to be filled. If multiple reservoir balloons 18c are used, each will have a corresponding entry-tubing adapter fill tube opening 3e and an entry-tubing adapter fill seal 3f.

The exit-tubing adapter 4 further includes an escape means 4d which may be a one-way-escape flap/valve, a bi-directional valve, an escape port opening, or an escape passage (any of which can be referred to as 4e). Further the escape means 4d can be filled with an escape port seal 4g to prevent an influx or exit of air or fluid, as desired.

Operation of Alternate Embodiment 12—Reservoir Including Fill-Tube and Balloon

Generally, the reservoir balloon 18c is filled during the manufacture of the reservoir 2, however users can also fill the reservoir 2 themselves. Injecting the desired material (such as fluids, liquids, gels, pastes, pellets, powders, gases, or other substances having material form) into the reservoir balloon 18c via the entry-tubing adapter fill tube opening 3e fills the reservoir balloon 18c. Once the reservoir balloon 18c is filled, the fill seal 3f is applied to the entry-tubing adapter 3 to prevent the reservoir contents RC from leaking out of the entry-tubing adapter fill tube opening 3e. The filled reservoir balloon 18c generally takes the shape of the reservoir chamber 18 or may expand the shape of the reservoir chamber 18 as material is injected into the reservoir balloon 18c.

During filling of the reservoir balloon 18c contents within the reservoir 2 are forced out of the escape means 4d as the reservoir balloon 18c expands. When the exit-tubing adapter escape passage 4e uses a one-way-escape flap/valve, it will only allow air or other reservoir contents RC to flow outward from the reservoir 2 into the atmosphere but will not allow air or other substances to flow into the reservoir 2. When filling of the reservoir balloon 18c stops, even if the reservoir balloon 18c is only partially filled, the escape means 4d can automatically close to prevent air or other substances from flowing into the reservoir 2. When the exit-tubing adapter escape means 4d uses an escape passage or an escape port opening, it should be filled with the escape port seal 4g to prevent air or other substances from flowing into or out of the reservoir 2 in an undesired manner.

The reservoir balloon 18c may be comprised of material that dissolves or decomposes so that the volume and/or shape of the reservoir 2 is thereafter determined by the reservoir chamber 18 rather than the reservoir balloon 18c. Suitable reservoir balloon material with these desired properties include food grade substances.

This embodiment allows users to more easily fill or refill the reservoir balloon. For example, in the field, military personnel can select the appropriate reservoir contents and fill the reservoir balloon on-site just prior to usage by the military personnel. The sealed balloon provides the user with an uncontaminated custom solution which can be mission specific. For example, if users will be deployed over an extended time in a chemically hostile environment, the reservoir balloon can be filled with enough nutrients for the applicable mission.

Alternate Embodiment 13—Reservoir Using Compression Sleeve

An alternate embodiment of the Inline Fluid Dispenser 1 includes a reservoir 2 having at least one reservoir chamber 18, as shown in any of the previous embodiments, which includes a bottom end 2a that abuts the entry-tubing adapter 3 and a top end 2b that abuts the exit-tubing adapter 4 wherein the reservoir 2 is covered with a reservoir compression sleeve 40, as shown in FIG. 29A-FIG. 29E which surrounds the outer circumference of the reservoir 2, as shown in FIG. 29B and provides insulation. The reservoir compression sleeve 40 is composed of a flexible material, such as plastic, thin foil, multi-layered films, or combinations thereof, wherein the elastically flexible material allows the volume of the reservoir to increase or decrease. The reservoir sleeve 40 can also be composed of a rigid or semi-rigid material that provides structural support to the reservoir 2. The reservoir compression generally forms a semi-circular oval or other shape to conform to the shape of the reservoir 2.

The reservoir compression sleeve 40 includes at least two sleeve cover plates 40a attached together, as shown in FIG. 29C. The sleeve cover plates 40a are formed by two or more sleeve cover plate sheets 40b, as shown in FIG. 29E or a single sleeve cover plate sheet 40c, as shown in FIG. 29D. When the sleeve cover plates 40a are formed by two or more sleeve cover plate sheets 40b, the sleeve cover plate sheets 40b are connected together to form layers that include an enclosure space or pocket 40d, as shown in FIG. 29E, between the sleeve cover plate sheets 40b. These pockets 40d provide an insulation barrier or opening which may be filled with air or other material to enhance the thermal properties of the reservoir compression sleeve 40 to assist with heating the contents of the reservoir 2, cooling the contents of the reservoir 2, or maintaining the temperature of the contents of the reservoir 2.

The reservoir compression sleeve 40 can include an embodiment in which the at least two sleeve cover plates 40a are attached together by push plates 40e, as shown in FIG. 29B. The push plates 40e are formed by two or more push plate sheets 40f. The push plates 40e can also provide an insulation barrier made of material that enhances the thermal properties of the reservoir compression sleeve 40 to assist with heating the contents of the reservoir 2, cooling the contents of the reservoir 2, or maintaining the temperature of the contents of the reservoir 2.

The reservoir compression sleeve 40 provides structural support to the reservoir 2 so that when force is applied to the reservoir compression sleeve 40 or generated by the compression sleeve cover plates and/or push plates 40e, force is applied to the reservoir 2. For example, a reservoir compression sleeve 40 that is stretched to fit around the reservoir will, when the stretching force is removed, constrict and thereby squeeze the reservoir. The squeezing or compression force applied to the reservoir 2 by the reservoir compression sleeve 40 can be selected based on the elasticity of the materials of the compression sleeve as well as the structural properties of the reservoir. Further, a reservoir compression sleeve 40 selected for having enough compressive force to squeeze the reservoir 2 may also generate fluid flow in the reservoir 2 by deforming the reservoir 2 and changing the volume of the reservoir 2, thereby taking advantage of the afore mentioned properties with regards to reservoir volume increasing or decreasing.

Operation of Alternate Embodiment 13—Reservoir Using Compression Sleeve

In use, reservoir compression sleeve 40 is suited to closely fit the reservoir 2 and generally must be stretched open by the user to be placed around the reservoir 2 by separating the sleeve cover plates 40a. The reservoir sleeve 40 can also be opened to allow it to be placed over the reservoir by pressing against the push plates 40e. When, for example, the push plates 40e are more rigid than the sleeve cover plates 40a, pushing on the push plates 40e tends to cause the sleeve cover plates 40a to move away from each other enlarging opening 41, which widens as the sleeve cover plates 40a stretch and move further away from each other. The reservoir 2 is placed within the opening 41, as shown in FIG. 29B. When the pressure against the push plates 40e is removed, such as when the user stops pressing against the push plates 40e, the elasticity of the materials of the sleeve cover plates 40a causes the sleeve cover plates 40a to move inward towards each other until the reservoir 2 is conformably surrounded by the reservoir compression sleeve 40.

This embodiment further provides protection, such as against nuclear biological and chemical hazards for all the embodiments of the Inline Fluid Dispenser 1 as a compression sleeve/cover.

Alternate Embodiment 14—Reservoir Attached to Handle

An alternate embodiment of the Inline Fluid Dispenser 1, as shown in FIGS. 30A, 30B, and 31-33 includes a reservoir 2, releasably attached to a dispenser handle 60. The dispenser handle 60 includes a release lever 61 connected at a distal end from a hose adapter 62.

The hose adapter 62 includes a hose adapter receptacle 64 for attachment to the entry-tubing adapter 3 of an Inline Fluid Dispenser. Note, for this embodiment, the entry-tubing adapter 3 may be provided at an angle to the reservoir 2. The hose adapter 62 further includes a hose connection 62A for attaching a hose or other fluid source (not shown). It is understood various sized hoses can be selected and where necessary a hose size adapter (not shown) may be used. The hose adapter 62 includes an on/off selector 62B for selecting whether fluid flowing into the hose adapter 62 is routed to the Inline Fluid Dispenser 1.

The dispenser handle release lever 61 connects to the exit-tubing adapter 4 of an Inline Fluid Dispenser. The dispenser handle 61 further includes a release support 63 positioned beneath the handle release lever 61 to aid in guiding and supporting the release lever 61. Depressing the handle release lever 61 helps disengage the handle 60 from an Inline Fluid Dispenser 1.

Figure 30A:
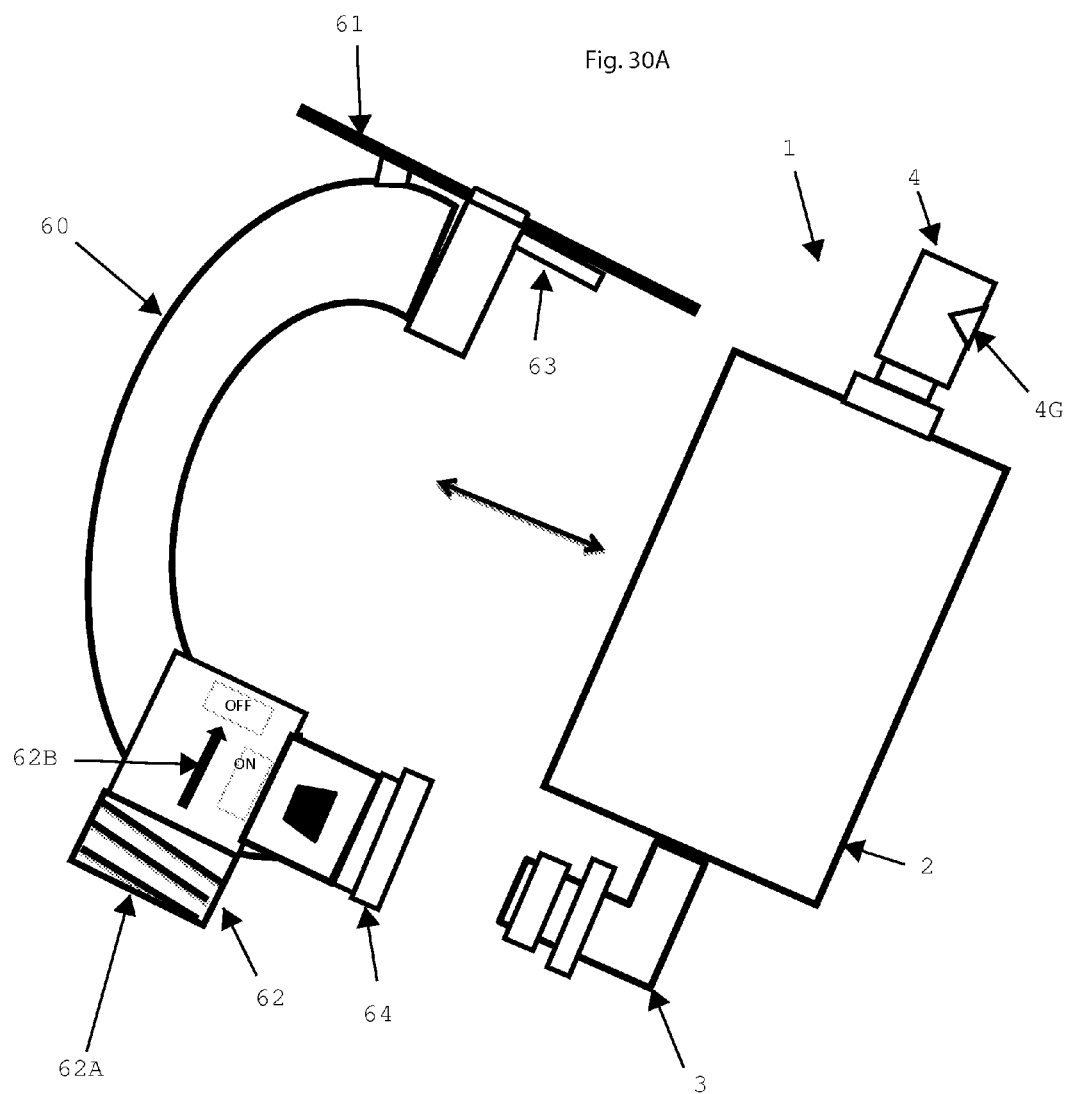
FIG. 30A presents an IFD aligned for attachment to a handle.
Figure 31:
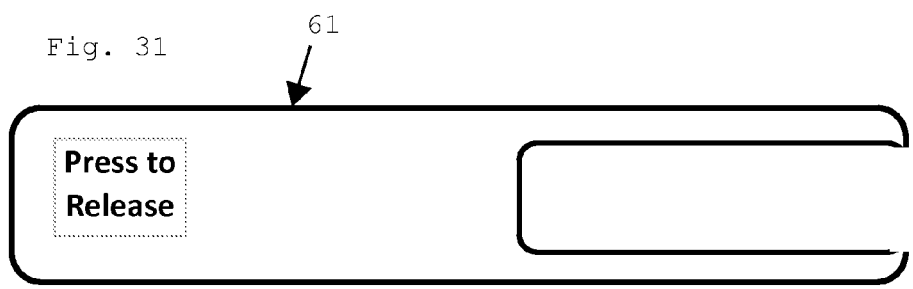
FIG. 31 presents a release lever.
Figure 32:
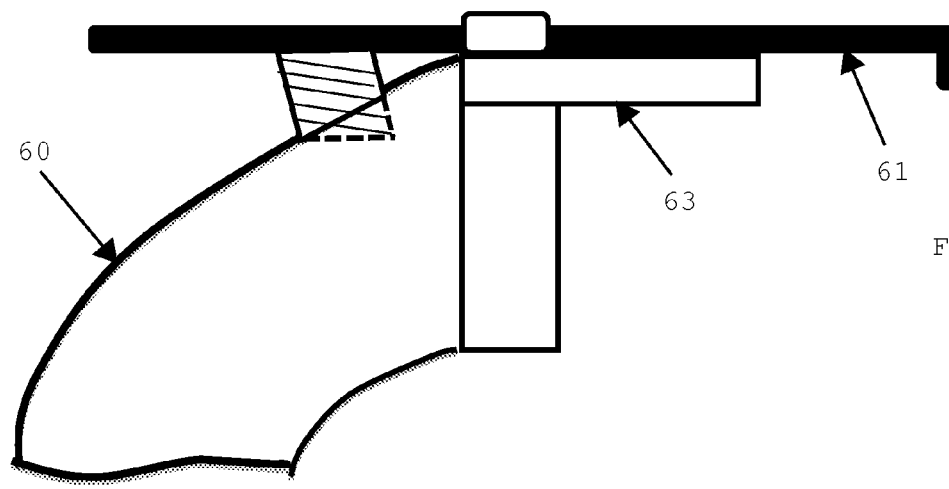
FIG. 32 presents a handle including a release lever.
Figure 33:
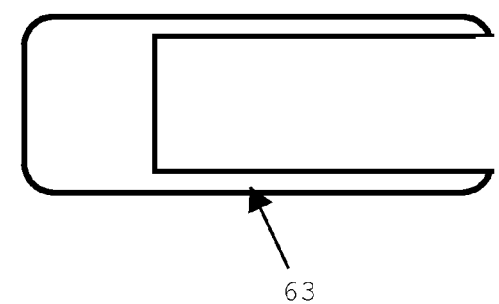
FIG. 33 presents a release lever support.

As shown in FIGS. 30A and 30B, the exit-tubing adapter 4 may be provided with a spray nozzle 4G or other suitable fluid outlet element.

This embodiment is well suited for usage such as spraying insecticide or anti-fungal solutions, spraying fire retardant solutions, spraying decontaminants, and other situations where mixing of the Inline Fluid Dispenser contents with a fluid source is necessary.

The relative size of the Inline Fluid Dispenser components can vary as needed. For example in using the Inline Fluid Dispenser with a handle to decontaminate a hazardous material spill site, the users can select a handle/reservoir size combination suitable for the specific area to be decontaminated. If necessary, a support/mobility structure (similar to a wheeled golf bag cart) can be used if a very large reservoir volume is desired.

Operation of Alternate Embodiment 14—Reservoir Attached to Handle

Usage of the Inline Fluid Dispenser with a handle begins with the selection a handle/reservoir size combination. Next the user snaps the handle 60 and Inline Fluid Dispenser 1 together at the entry-tubing adapter 3 and the exit-tubing adapter 4—. Next the user connects the fluid source to the hose connection 62A. Next the user turns the on/off selector 62B to control the volume of fluid which flows into the hose adapter 62 and is routed to the Inline Fluid Dispenser 1 and out the exit-tubing adapter 4.

Replacement of the Inline Fluid Dispenser 1 simply involves pressing the dispenser handle release lever 61, removing the old the Inline Fluid Dispenser 1, and inserting a replacement Inline Fluid Dispenser 1.

General Closing Paragraph

The embodiments and elements of the Inline Fluid Dispenser 1 herein may be composed of generally known materials including polymers, plastics, and material resistant to nuclear, biological, and chemical hazards, as well as food grade materials, as appropriate. Further, it is envisioned the Inline Fluid Dispenser 1 may be produced to comply with various specifications such as military specifications and regulatory specifications.

While various embodiments of the present invention have been shown and described herein, it will be obvious that such embodiments are provided by way of example only. Numerous variations, changes, substitutions, and embodiment combinations may be made without departing from the invention herein. Accordingly, it is intended that the invention be limited only by the spirit and scope of the appended claims.

What is claimed is:

1. A Fluid Dispenser comprising:
   a handle having fluid connecting means;
   at least one reservoir removably connected in fluid communication with the handle, the at least one reservoir including at least one solution cartridge having at least one chamber for containing reservoir contents;
   a fluid supply tube providing a supply fluid path, the fluid supply tube extending through the reservoir and including a central chamber having metering holes;
   an entry tubing adapter attached to a first end of the fluid supply tube and including an entry flow valve;
   an exit tubing adapter attachable to a second end of the fluid supply tube and including an exit flow valve;
   an activation system for controlling fluid flow between the fluid supply tube and the reservoir;
   wherein the fluid supply tube contents and the least one reservoir contents mix together and flow through the exit flow valve when the there is fluid communication between the at least one reservoir and the fluid supply tube central chamber, and
   wherein the supply fluid flow path is always available between the entry tubing adapter and the exit tubing adapter.

2. The Fluid Dispenser of claim 1 wherein the entry flow valve and the exit flow valve are both one-way check valves oriented to only allow fluid flow in a direction of travel from the entry tubing adapter towards the exit tubing adapter.

3. The Fluid Dispenser of claim 2 wherein the activation system includes a movable activator tube mounted concentrically over the fluid supply tube and controls fluid communication between the reservoir and the fluid supply tube, wherein when the activation system is activated it allows fluid entering the entry flow valve to mix with contents of the reservoir chamber to form mixed contents; and
   wherein the mixed contents flow from the fluid supply tube and the exit flow valve to an output device.

4. The Fluid Dispenser of claim 2 wherein the activation system includes: a first adjustable fluid router positioned within the entry tubing adapter, the first adjustable fluid router further including a plurality of first fluid router ports and an adjustable first fluid router activator;
   wherein when the adjustable first fluid router activator is activated the first adjustable fluid router allows fluid communication between the reservoir chamber and the fluid supply tube thereby allowing reservoir contents to flow from the reservoir through fluid router ports, the fluid supply tube, and the exit flow valve to an fluid output device.

5. The Fluid Dispenser of claim 2 further including wherein the at least one reservoir is refillable or a cartridge.

6. An Fluid Dispenser for attachment to a handle comprising:
   the handle having fluid connecting means;
   at least one reservoir removably connected in fluid communication with the handle, at least one reservoir having at least one reservoir chamber for containing reservoir contents,
   a fluid supply tube extending through the reservoir chamber, the fluid supply tube including metering holes;
   an entry tubing adapter attached at one end to a first end of the fluid supply tube and including an entry flow valve, wherein the other end of the entry tubing adapter is attachable to the handle;
   an exit tubing adapter attached at one end to a second end of the fluid supply tube and including an exit flow valve, wherein the other end of the exit tubing adapter is attachable to the handle,
   an activation system including a movable activator tube mounted concentrically over the fluid supply tube, the movable activator tube including metering orifices;
   wherein rotation of the movable activator tube to align the activator tube metering orifices with the fluid supply tube metering holes provides fluid communication between the reservoir and the fluid supply tube and allows fluid entering the entry flow valve to mix with contents of the reservoir chamber to form mixed contents; and
   wherein the mixed contents flow from the fluid supply tube and the exit flow valve.

7. The Fluid Dispenser of claim 6 wherein the entry flow valve and the exit flow valve are both one-way check valves oriented to only allow fluid flow in a direction of travel from the entry tubing adapter towards the exit tubing adapter.

8. The Fluid Dispenser of claim 7 having wherein the at least one reservoir has multiple chambers.

9. The Fluid Dispenser of claim 7 wherein the fluid supply tube further includes a cone shaped section and metering channels which extend into the fluid supply tube at an angle and direct fluid flow into the fluid supply tube.

10. The Fluid Dispenser of claim 7 wherein the at least one reservoir is refillable.

11. The Fluid Dispenser of claim 2 wherein the at least one reservoir includes a self-constricting reservoir shell or compression sleeve which applies a volume decreasing force to the at least one reservoir.

12. The Fluid Dispenser of claim 7 including multiple reservoirs each having at least one solution cartridge, the at least one solution cartridge having at least one chamber for containing reservoir contents.

13. The Fluid Dispenser of claim 7 wherein the at least one reservoir further includes:
- at least one reservoir chamber;
- an expandable balloon positioned within at least one reservoir chamber and suited to contain substances;
- a fill tube opening positioned on the entry tubing adapter; and
- escape means to allow the contents of the at least one reservoir chamber to flow out of the at least one reservoir as the reservoir balloon is filled with substances.

14. The Fluid Dispenser of claim 7 wherein the activator tube further includes an aperture and a flap positioned over the aperture which operate together control fluid flow between the activator tube and the at least one reservoir.

15. A Fluid Dispenser for attachment to handle comprising:
- the handle having fluid connecting means;
- at least one reservoir removably connected in fluid communication with the handle, at least one reservoir including at least one reservoir chamber for containing reservoir contents;
- a fluid supply tube extending through the at least one reservoir chamber;
- an entry tubing adapter attached at one end to a first end of the fluid supply tube, wherein the other end of the entry tubing adapter is attachable to the input device, the entry-tubing adapter including an entry flow valve, a first internal diffuser inlet, and a first internal diffuser outlet, wherein the first internal diffuser inlet, and the first internal diffuser outlet are both protrusions that extend from the entry-tubing adapter into the at least one reservoir chamber to direct fluid flow respectively into and out of the at least one reservoir chamber;
- an exit tubing adapter attached at one end to a second end of the fluid supply tube and including an exit flow valve, wherein the other end of the exit tubing adapter is attachable to the handle;
- an activation system including a first adjustable fluid router positioned within at least the entry tubing adapter, the first adjustable fluid router further including a plurality of first fluid router ports and an adjustable first fluid router activator;
- wherein when at least one of the plurality of first fluid router ports is aligned with the first internal diffuser inlet, fluid communication is provided with the at least one reservoir chamber whereby fluid entering the entry flow valve flows into the at least one reservoir chamber to combine with the at least one reservoir contents and form mixed contents; and
- wherein when at least one of the plurality of first fluid router ports is aligned with the first internal diffuser outlet fluid, fluid communication is provided between the at least one reservoir chamber and the fluid supply tube thereby allowing the mixed contents to flow from the at least one reservoir chamber and through the at least one of the plurality of first fluid router ports, the fluid supply tube, and the exit flow valve.

16. The Fluid Dispenser of claim 15 wherein when the adjustable fluid router activator is in an activated position, at least one of the plurality of fluid router ports is aligned with the first internal diffuser inlet and at the same time at least one of the plurality of fluid router ports is aligned with the first internal diffuser outlet fluid thereby providing fluid communication between the reservoir chamber and the fluid supply tube.

17. The Fluid Dispenser of claim 15 wherein the entry flow valve and the exit flow valve are both one-way check valves oriented to only allow fluid flow in a direction of travel from the entry tubing towards the exit tubing adapter.

18. The Fluid Dispenser of claim 15 wherein the activation system further includes a second adjustable fluid router positioned within the exit tubing adapter, the adjustable fluid router further including a plurality of second fluid router ports and an adjustable second fluid router activator;
- wherein when at least one of the plurality of second fluid router ports is aligned with the second internal diffuser inlet, fluid communication is provided with at least one reservoir chamber whereby fluid entering the second fluid router flows into the at least one reservoir chamber to combine with the at least one reservoir contents and form mixed contents; and
- wherein when at least one of the plurality of second fluid router ports is aligned with the second internal diffuser outlet fluid, fluid communication is provided between at least one reservoir chamber and the fluid supply tube thereby allowing the mixed contents to flow from at least one reservoir chamber and through the at least one of the plurality of second fluid router ports, the fluid supply tube, and the exit flow valve.

19. The Fluid Dispenser of claim 15 further including a supplemental check valve positioned in the fluid supply tube downstream from the exit-tubing adapter to prevent fluid that is flowing through the second adjustable fluid router from flowing down the fluid supply tube towards the entry-tubing adapter.

20. The Fluid Dispenser of claim 15 including multiple reservoirs each having at least one solution cartridge having at least one chamber for containing reservoir contents.

* * * * *